United States Patent
Nielsen et al.

(10) Patent No.: US 10,750,354 B2
(45) Date of Patent: *Aug. 18, 2020

(54) METHODS AND APPARATUS TO PERFORM AUDIO SENSOR SELECTION IN AN AUDIENCE MEASUREMENT DEVICE

(71) Applicant: The Nielsen Company (US), LLC, New York, NY (US)

(72) Inventors: Christen V. Nielsen, Palm Harbor, FL (US); James J. Vitt, Palm Harbor, FL (US); Timothy Scott Cooper, Oldsmar, FL (US); Douglas Brent Turnbow, Odessa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/291,969

(22) Filed: Mar. 4, 2019

(65) Prior Publication Data

US 2019/0261162 A1   Aug. 22, 2019

Related U.S. Application Data

(63) Continuation of application No. 15/192,666, filed on Jun. 24, 2016, now Pat. No. 10,225,730.

(51) Int. Cl.
*H04W 8/20* (2009.01)
*H04W 8/22* (2009.01)
(Continued)

(52) U.S. Cl.
CPC .............. *H04W 8/20* (2013.01); *H04H 60/31* (2013.01); *H04H 60/37* (2013.01);
(Continued)

(58) Field of Classification Search
CPC .......... H04W 8/20; H04W 8/22; H04H 60/37; H04H 60/31; H04H 2201/50; H04R 29/004
See application file for complete search history.

(56) References Cited

U.S. PATENT DOCUMENTS 7,739,705 B2   6/2010   Lee et al.
7,882,514 B2 *  2/2011   Nielsen ................ H04N 17/04
                                                      725/14
(Continued)

FOREIGN PATENT DOCUMENTS

CN   101339242 A   1/2009
CN   105874469 A   8/2016

OTHER PUBLICATIONS

United States Patent and Trademark Office, "Office Action," dated Jul. 26, 2017 in connection with U.S. Appl. No. 15/192,666, 11 pages.

(Continued)

*Primary Examiner* — Bobbak Safaipour
(74) *Attorney, Agent, or Firm* — Hanley, Flight & Zimmerman

(57) ABSTRACT

Methods, apparatus, systems and articles of manufacture to perform audio sensor selection in an audience metering device are disclosed. An example apparatus includes at least two audio sensors to receive audio at an audience metering device and a selection tester to identify a plurality of audio sensor configurations supported by the audience metering device, the plurality of audio sensor configurations identifying respective gain values to be applied to the plurality of audio sensors. The selection tester is further to select one of the first one of the audio sensor configurations or the second one of the audio sensor configurations based on a comparison of a first quality metric and a second quality metric. The example apparatus further includes a media identifier to identify audio received at the audience metering device using the selected one of the audio sensor configurations.

20 Claims, 12 Drawing Sheets

(51) Int. Cl.
  *H04R 29/00* (2006.01)
  *H04H 60/31* (2008.01)
  *H04H 60/37* (2008.01)
(52) U.S. Cl.
  CPC ............ *H04R 29/004* (2013.01); *H04W 8/22* (2013.01); *H04H 2201/50* (2013.01)

(56) References Cited

U.S. PATENT DOCUMENTS

| | | | | |
|---|---|---|---|---|
| 8,156,517 | B2* | 4/2012 | Nielsen | H04H 60/31 |
| | | | | 206/205 |
| 8,180,712 | B2* | 5/2012 | Nelson | H04H 60/32 |
| | | | | 706/1 |
| 8,375,404 | B2* | 2/2013 | Nielsen | H04H 60/29 |
| | | | | 206/205 |
| 8,793,717 | B2* | 7/2014 | Lee | H04H 60/32 |
| | | | | 725/131 |
| 8,918,802 | B2* | 12/2014 | Ramaswamy | H04H 60/58 |
| | | | | 725/18 |
| 9,094,710 | B2 | 7/2015 | Lee et al. | |
| 9,215,489 | B2* | 12/2015 | Williams | H04N 21/4126 |
| 9,332,305 | B1* | 5/2016 | Lee | H04N 21/42203 |
| 9,369,762 | B2 | 6/2016 | Falcon | |
| 9,686,031 | B2* | 6/2017 | Peiffer | H04H 60/32 |
| 9,900,652 | B2* | 2/2018 | Ramaswamy | H04H 20/95 |
| 9,924,224 | B2* | 3/2018 | Srinivasan | H04N 21/44213 |
| 10,225,730 | B2* | 3/2019 | Nielsen | H04R 29/004 |
| 2006/0203105 | A1* | 9/2006 | Srinivasan | H04H 60/45 |
| | | | | 348/231.4 |
| 2007/0011040 | A1* | 1/2007 | Wright | G06Q 30/02 |
| | | | | 725/46 |
| 2007/0011558 | A1* | 1/2007 | Wright | H04H 20/31 |
| | | | | 714/755 |
| 2007/0260340 | A1 | 11/2007 | Mao | |
| 2008/0148307 | A1 | 6/2008 | Nielsen et al. | |
| 2008/0215315 | A1* | 9/2008 | Topchy | H04H 60/58 |
| | | | | 704/205 |
| 2009/0225994 | A1* | 9/2009 | Topchy | G10L 25/48 |
| | | | | 381/56 |
| 2010/0169904 | A1 | 7/2010 | Nielsen et al. | |
| 2010/0223062 | A1* | 9/2010 | Srinivasan | G11B 20/10 |
| | | | | 704/500 |
| 2012/0072940 | A1* | 3/2012 | Fuhrer | H04H 60/31 |
| | | | | 725/13 |
| 2012/0110027 | A1* | 5/2012 | Falcon | G06Q 30/02 |
| | | | | 707/802 |
| 2012/0219156 | A1* | 8/2012 | Ramaswamy | H04H 60/58 |
| | | | | 381/56 |
| 2013/0058511 | A1* | 3/2013 | Nicolet | H04S 7/30 |
| | | | | 381/303 |
| 2014/0161305 | A1* | 6/2014 | Lee | G06K 9/00362 |
| | | | | 382/103 |
| 2014/0278933 | A1* | 9/2014 | McMillan | G06Q 30/0246 |
| | | | | 705/14.45 |
| 2014/0282664 | A1 | 9/2014 | Lee | |
| 2016/0066034 | A1* | 3/2016 | Hicks | H05K 999/99 |
| | | | | 725/12 |
| 2016/0211934 | A1* | 7/2016 | Lee | H04N 21/42203 |
| 2016/0379456 | A1* | 12/2016 | Nongpiur | G08B 13/1672 |
| | | | | 340/541 |
| 2017/0150100 | A1 | 5/2017 | Chen et al. | |
| 2017/0201795 | A1* | 7/2017 | Hicks | H05K 999/99 |
| 2017/0372359 | A1* | 12/2017 | Bodzo | G06Q 30/0201 |
| 2017/0374413 | A1* | 12/2017 | Cooper | H04N 21/4424 |
| 2018/0025610 | A1* | 1/2018 | Kay | G08B 21/0492 |
| | | | | 340/521 |

OTHER PUBLICATIONS

European Patent Office, "European Search Report", in connection with European Patent Application No. 17001034.2, dated Oct. 25, 2017, 11 pages.

United States Patent and Trademark Office, "Office Action," dated Jan. 26, 2018 in connection with U.S. Appl. No. 15/192,666, 10 pages.

United States Patent and Trademark Office, "Advisory Action," dated Apr. 11, 2018 in connection with U.S. Appl. No. 15/192,666, 7 pages.

United States Patent and Trademark Office, "Office Action," dated May 17, 2018 in connection with U.S. Appl. No. 15/192,666, 10 pages.

United States Patent and Trademark Office, "Notice of Allowance," dated Oct. 12, 2018 in connection with U.S. Appl. No. 15/192,666, 5 pages.

China Intellectual Property Administration, "First Notification of Office Action," dated Jul. 24, 2019, in connection with Chinese Patent Application No. 201710478863.3, 14 pages (full document and English translation attached).

China National Intellectual Property Administration, "Notice of Decision of Granting Patent Right for Invention," dated Feb. 3, 2020 in connection with Chinese Patent Application No. 201710478863.3, 5 pages.

\* cited by examiner

| | AUDIO SENSOR CONFIGURATION | SIGNAL TO NOISE RATIO |
|---|---|---|
| 1320 | A | 5.3 dB |
| 1322 | B | 5.4 dB |
| 1324 | C | 20.0 dB |
| 1326 | D | 26.4 dB |
| 1328 | AB | 8.4 dB |
| 1330 | AC | 15.3 dB |
| 1332 | AD | 17.4 dB |
| 1334 | ABC | 19.6 dB |
| 1336 | ABD | 21.8 dB |
| 1338 | ACD | 32.4 dB |
| 1340 | BC | 22.6 dB |
| 1342 | BD | 15.8 dB |
| 1344 | BCD | 34.5 dB |
| 1346 | CD | 40.3 dB |
| 1348 | ABCD | 26.5 dB |

FIG. 13

METHODS AND APPARATUS TO PERFORM AUDIO SENSOR SELECTION IN AN AUDIENCE MEASUREMENT DEVICE

RELATED APPLICATIONS

This patent arises from a continuation of U.S. patent application Ser. No. 15/192,666, filed on Jun. 24, 2016, entitled "METHODS AND APPARATUS TO PERFORM AUDIO SENSOR SELECTION IN AN AUDIENCE MEASUREMENT DEVICE." U.S. patent application Ser. No. 15/192,666 is hereby incorporated by reference in its entirety. Priority to U.S. patent application Ser. No. 15/192,666 is hereby claimed.

FIELD OF THE DISCLOSURE

This disclosure relates generally to media monitoring, and, more particularly, to methods and apparatus to perform audio sensor selection in an audience measurement device.

BACKGROUND

Monitoring companies desire knowledge on how users interact with media devices, such as smartphones, tablets, laptops, smart televisions, etc. To facilitate such monitoring, monitoring companies enlist panelists and install meters at the media presentation locations of those panelists. The meters monitor media presentations and transmit media monitoring information to a central facility of the monitoring company. Such media monitoring information enables the media monitoring companies to, among other things, monitor exposure to advertisements, determine advertisement effectiveness, determine user behavior, identify purchasing behavior associated with various demographics, etc.

BRIEF DESCRIPTION OF THE DRAWINGS

FIG. 13 is an example data table representing signal to noise ratios of identified watermarks determined in connection with different audio sensor configurations.

The figures are not to scale. Wherever possible, the same reference numbers will be used throughout the drawing(s) and accompanying written description to refer to the same or like parts.

DETAILED DESCRIPTION

Traditionally, audience measurement entities (also referred to herein as "ratings entities" or "monitoring companies") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

Figure 1:
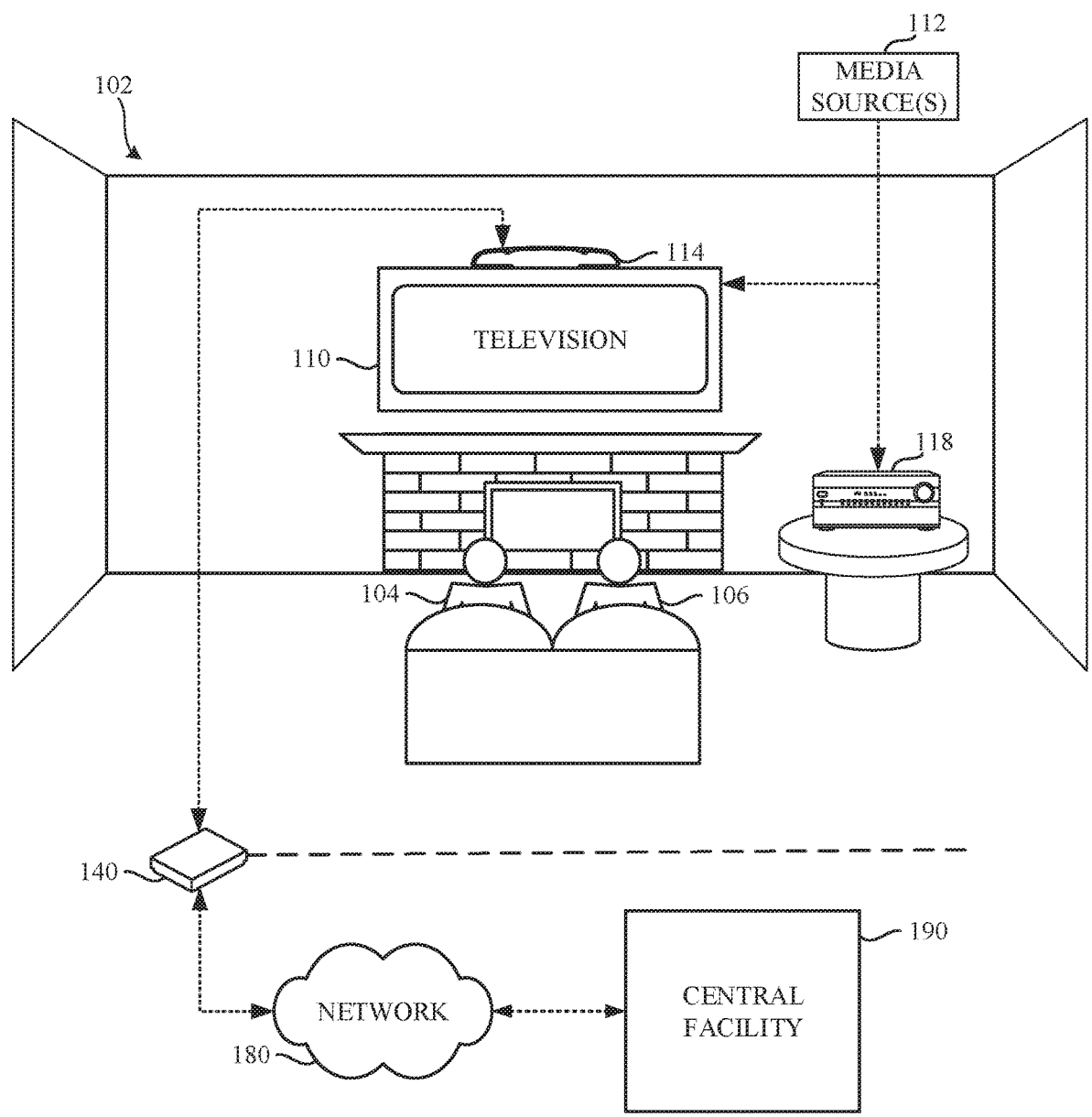
FIG. 1 is a block diagram of an example system constructed in accordance with the teachings of this disclosure for performing audio sensor selection in an audience measurement device.

FIG. 1 is an illustration of an example audience measurement system constructed in accordance with the teachings of this disclosure to perform symbol based watermark detection. In the illustrated example of FIG. 1, an example media presentation environment 102 includes example panelists 104, 106, an example media presentation device 110 that receives media from an example media source 112, and an example meter 114. The meter 114 identifies the media presented by the media presentation device 110 and reports media monitoring information to an example central facility 190 of an example audience measurement entity via an example gateway 140 and an example network 180.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the media presentation device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media presentation device 110 is a television. However, the example media presentation device 110 can correspond to any type of audio, video and/or multimedia presentation device capable of presenting media audibly and/or visually. In the illustrated example of FIG. 1, the media presentation device 110 is in communication with an example audio/video receiver 118. In some examples, the media presentation device 110 (e.g., a television) may communicate audio to another media presentation device (e.g., the audio/video receiver 118) for output by one or more speakers (e.g., surround sound speakers, a sound bar, etc.). As another example, the media presentation device 110 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media presentation device 110 receives media from the media source 112. The media source 112 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media presentation device 110 can correspond to a television and/or display device that supports the National Television Standards Committee (NTSC) standard, the Phase Alternating Line (PAL) standard, the Systeme Electronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media.

In examples disclosed herein, an audience measurement entity provides the meter 114 to the panelist 104, 106 (or household of panelists) such that the meter 114 may be installed by the panelist 104, 106 by simply powering the meter 114 and placing the meter 114 in the media presentation environment 102 and/or near the media presentation device 110 (e.g., near a television set). In some examples, the meter 114 may be provided to the panelist 104, 106 by an entity other than the audience measurement entity. In some examples, more complex installation activities may be performed such as, for example, affixing the meter 114 to the media presentation device 110, electronically connecting the meter 114 to the media presentation device 110, etc. The example meter 114 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 190 via the gateway 140 and the network 180. While the media monitoring information is transmitted by electronic transmission in the illustrated example of FIG. 1, the media monitoring information may additionally or alternatively be transferred in any other manner such as, for example, by physically mailing the meter 114, by physically mailing a memory of the meter 114, etc.

The meter 114 of the illustrated example combines audience measurement data and people metering data. For example, audience measurement data is determined by monitoring media output by the media presentation device 110 and/or other media presentation device(s), and audience identification data (also referred to as demographic data, people monitoring data, etc.) is determined from people monitoring data provided to the meter 114. Thus, the example meter 114 provides dual functionality of an audience measurement meter that is to collect audience measurement data, and a people meter that is to collect and/or associate demographic information corresponding to the collected audience measurement data.

For example, the meter 114 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media presentation device 110. To extract media identification data, the meter 114 of the illustrated example of FIG. 1 monitors for watermarks (sometimes referred to as codes) included in the presented media.

In examples disclosed herein, to monitor media presented by the media presentation device 110, the meter 114 of the illustrated example senses audio (e.g., acoustic signals or ambient audio) output (e.g., emitted) by the media presentation device 110 and/or some other audio presenting system (e.g., the audio/video receiver 118 of FIG. 1). For example, the meter 114 processes the signals obtained from the media presentation device 110 to detect media and/or source identifying signals (e.g., audio watermarks) embedded in portion(s) (e.g., audio portions) of the media presented by the media presentation device 110. To, for example, sense ambient audio output by the media presentation device 110, the meter 114 of the illustrated example includes multiple example audio sensor (e.g., microphone(s) and/or other acoustic sensors). In some examples, the meter 114 may process audio signals obtained from the media presentation device 110 via a direct cable connection to detect media and/or source identifying audio watermarks embedded in such audio signals.

In some examples, the media presentation device 110 utilizes rear-facing speakers. When rear-facing speakers are used, using a forward-facing audio sensor in the meter 114 to receive audio output by the rear-facing speakers does not typically facilitate good recognition of the watermark(s). In contrast, when a rear-facing audio sensor of the meter 114 is used in connection with rear-facing speakers, better recognition of the watermarks included in the audio output by the media presentation device can be achieved. In examples disclosed herein, audio sensor(s) of the meter 114 are selected to facilitate the best possible watermark recognition. For example, when the media presentation device is using rear-facing speakers, rear-facing audio sensor(s) of the meter 114 may be used; when the media presentation device 110 is using front-facing speakers, front-facing audio sensor(s) of the meter 114 may be used. Moreover, different configurations of audio sensor(s) of the meter 114 may be used to, for example, account for different acoustic environments resulting in different recognition levels of watermarks, account for differently configured audio systems (e.g., a sound bar system, a 5.1 surround sound system, a 7.1 surround sound system, etc.), different configurations being used based on a selected input to the media presentation device 110 (e.g., surround sound speakers may be used when presenting a movie, whereas rear-facing speakers may be used when presenting broadcast television, etc.)

In some examples, the meter 114 can be physically coupled to the media presentation device 110, may be configured to capture audio emitted externally by the media presenting device 110 (e.g., free field audio) such that direct physical coupling to an audio output of the media presenting device 110 is not required. For example, the meter 114 of the illustrated example may employ non-invasive monitoring not involving any physical connection to the media presentation device 110 (e.g., via Bluetooth® connection, WIFI® connection, acoustic watermarking, etc.) and/or invasive monitoring involving one or more physical connections to the media presentation device 110 (e.g., via USB connection, a High Definition Media Interface (HDMI) connection, an Ethernet cable connection, etc.). In some examples, invasive monitoring may be used to facilitate a determination of which audio sensor(s) should be used by the meter 114. For example, the meter 114 may be connected to the media presentation device using a Universal Serial Bus (USB) cable such that a speaker configuration of the media presentation device 110 can be identified to the meter 114. Based on this information, the meter 114 may select the appropriate audio sensor(s) best suited for monitoring the audio output by the media presentation device 110. For example, if the media presentation device 110 indicated that front-facing speakers were being used, the meter 114 may select the front-facing audio sensor(s) for monitoring the output audio.

To generate exposure data for the media, identification(s) of media to which the audience is exposed are correlated with people data (e.g., presence information) collected by the meter 114. The meter 114 of the illustrated example collects inputs (e.g., audience identification data) representative of the identities of the audience member(s) (e.g., the panelists 104, 106). In some examples, the meter 114 collects audience identification data by periodically or a-periodically prompting audience members in the media presentation environment 102 to identify themselves as present in the audience. In some examples, the meter 114 responds to predetermined events (e.g., when the media presenting device 110 is turned on, a channel is changed, an infrared control signal is detected, etc.) by prompting the audience member(s) to self-identify. The audience identification data and the exposure data can then be complied with the demographic data collected from audience members such as, for example, the panelists 104, 106 during registration to develop metrics reflecting, for example, the demographic composition of the audience. The demographic data includes, for example, age, gender, income level, educational level, marital status, geographic location, race, etc., of the panelist.

In some examples, the meter 114 may be configured to receive panelist information via an input device such as, for example a remote control, an Apple® iPad®, a cell phone, etc. In such examples, the meter 114 prompts the audience members to indicate their presence by pressing an appropriate input key on the input device. The meter 114 of the illustrated example may also determine times at which to prompt the audience members to enter information to the meter 114. In some examples, the meter 114 of FIG. 1 supports audio watermarking for people monitoring, which enables the meter 114 to detect the presence of a panelist-identifying metering device in the vicinity (e.g., in the media presentation environment 102) of the media presentation device 110. For example, the audio sensor(s) of the meter 114 may be able to sense example audio output (e.g., emitted) by an example panelist-identifying metering device such as, for example, a wristband, a cell phone, etc. that is uniquely associated with a particular panelist. The audio output by the example panelist-identifying metering device may include, for example one or more audio watermarks to facilitate identification of the panelist-identifying metering device and/or the panelist 104 associated with the panelist-identifying metering device.

The meter 114 of the illustrated example communicates with a remotely located central facility 190 of the audience measurement entity. In the illustrated example of FIG. 1, the example meter 114 communicates with the central facility 190 via a gateway 140 and a network 180. The example metering device 114 of FIG. 1 sends media identification data and/or audience identification data to the central facility 190 periodically, a-periodically and/or upon request by the central facility 190.

The example gateway 140 of the illustrated example of FIG. 1 is a router that enables the meter 114 and/or other devices in the media presentation environment (e.g., the media presentation device 110) to communicate with the network 180 (e.g., the Internet.)

In some examples, the example gateway 140 facilitates delivery of media from the media source(s) 112 to the media presentation device 110 via the Internet. In some examples, the example gateway 140 includes gateway functionality such as modem capabilities. In some other examples, the example gateway 140 is implemented in two or more devices (e.g., a router, a modem, a switch, a firewall, etc.). The gateway 140 of the illustrated example may communicate with the network 126 via Ethernet, a digital subscriber line (DSL), a telephone line, a coaxial cable, a USB connection, a Bluetooth connection, any wireless connection, etc.

In some examples, the example gateway 140 hosts a Local Area Network (LAN) for the media presentation environment 102. In the illustrated example, the LAN is a wireless local area network (WLAN), and allows the meter 114, the media presentation device 110, etc. to transmit and/or receive data via the Internet. Alternatively, the gateway 140 may be coupled to such a LAN. In some examples, the example gateway 140 is implemented by a cellular communication system and may, for example, enable the meter 114 to transmit information to the central facility 190 using a cellular connection.

The network 180 of the illustrated example is a wide area network (WAN) such as the Internet. However, in some examples, local networks may additionally or alternatively be used. Moreover, the example network 180 may be implemented using any type of public or private network such as, but not limited to, the Internet, a telephone network, a local area network (LAN), a cable network, and/or a wireless network, or any combination thereof.

The central facility 190 of the illustrated example is implemented by one or more servers. The central facility 190 processes and stores data received from the meter(s) 114. For example, the example central facility 190 of FIG. 1 combines audience identification data and program identification data from multiple households to generate aggregated media monitoring information. The central facility 190 generates a report(s) for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 114 of the illustrated example provides a combination of media metering and people metering. The meter 114 of FIG. 1 includes its own housing, processor, memory and/or software to perform the desired media monitoring and/or people monitoring functions. The example meter 114 of FIG. 1 is a stationary device disposed on or near the media presentation device 110. To identify and/or confirm the presence of a panelist present in the media presentation environment 102, the example meter 114 of the illustrated example includes a display. For example, the display provides identification of the panelists 104, 106 present in the media presentation environment 102. For example, in the illustrated example, the meter 114 displays indicia (e.g., illuminated numerical numerals 1, 2, 3, etc.) identifying and/or confirming the presence of the first panelist 104, the second panelist 106, etc. In the illustrated example, the meter 114 is affixed to a top of the media presentation device 110. However, the meter 114 may be affixed to the media presentation device in any other orientation such as, for example, on a side of the media presentation device 110, on the bottom of the media presentation device 110, and/or may not be affixed to the media presentation device 110. For example, the meter 114 may be placed in a location near the media presentation device 110.

Figure 2:
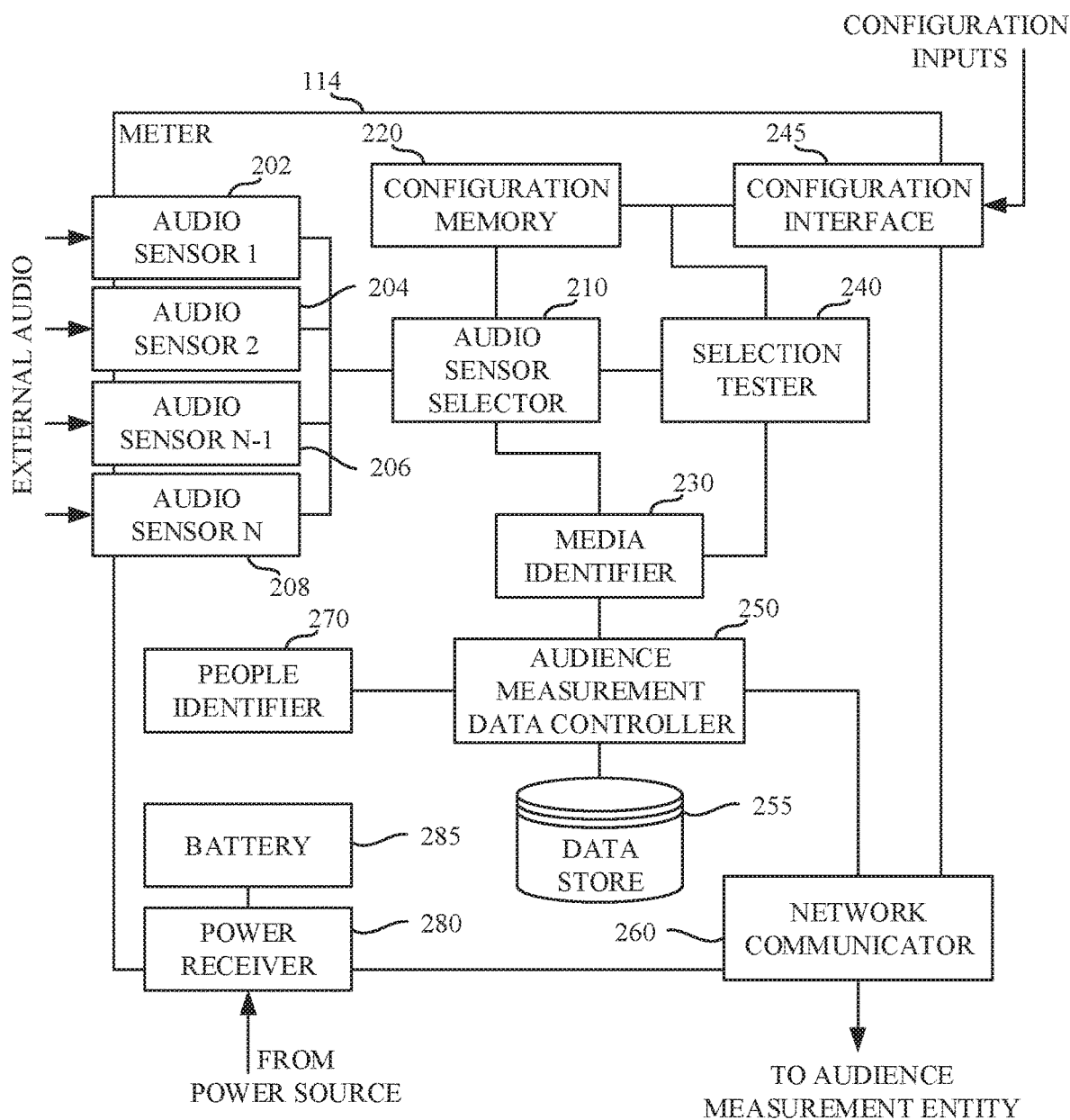
FIG. 2 is a block diagram of the example meter of FIG. 1.

FIG. 2 is a block diagram illustrating an example implementation of the example meter 114 of FIG. 1. The example meter 114 of FIG. 2 includes example audio sensors 202, 204, 206, 208, an example audio sensor selector 210, an example configuration memory 220, an example media identifier 230, an example selection tester 240, an example configuration interface, 245, an example audience measurement data controller 250, an example data store 255, an example network communicator 260, an example people identifier 270, an example power receiver 280, and an example battery 285.

The example audio sensors 202, 204, 206, 208 of the illustrated example of FIG. 2 are implemented by microphones and/or other acoustic sensors. The example audio sensors 202, 204, 206, 208 each receive ambient sound (e.g., free field audio) including audible media presented in the vicinity of the meter 114. Alternatively, one or more of the audio sensor(s) 202, 204, 206, 208 may be implemented by a line input connection. The line input connection may allow one or more external microphone(s) to be used with the meter 114 and/or, in some examples, may enable one or more of the audio sensor 202, 204, 206, 208 to be directly connected to an output of a media presentation device (e.g., an auxiliary output of a television, an auxiliary output of an audio/video receiver of a home entertainment system, etc.) Advantageously, the meter 114 is positioned in a location such that the audio sensor 202, 204, 206, 208 receives ambient audio produced by the television and/or other devices of the home entertainment system with sufficient quality to identify media presented by the media presentation device 110 and/or other devices of the media presentation environment 102 (e.g., the audio/video receiver 118). For example, in examples disclosed herein, the meter 120 may be placed on top of the television, secured to the bottom of the television, etc.

In the illustrated example of FIG. 2, four audio sensors 202, 204, 206, 208 are shown. Each of the four audio sensors 202, 204, 206, 208 corresponds to a front-right microphone, a front-left microphone, a rear-right microphone, and a rear-left microphone, respectively. While four audio sensors are used in the illustrated example of FIG. 2, any number of audio sensors may additionally or alternatively be used. Example placements of the example audio sensors 202, 204, 206, 208 on the meter 114 are shown below in the illustrated examples of FIGS. 3, 4, and/or 5.

The example audio sensor selector 210 of the illustrated example of FIG. 2 combines audio received by the audio sensors 202, 204, 206, 208 to prepare a combined audio signal for analysis by the media identifier 230. In some examples, the example audio sensor selector 210 combines the audio received by the audio sensor 202, 204, 206, 208 by mixing the audio. In examples disclosed herein, the example audio sensor selector 210 consults the example configuration memory 220 to identify which audio sensors 202, 204, 206, 208 should have their respective received audio signals passed through to the media identifier 230. Conversely, in some examples, the example audio sensor selector 210 may identify which audio sensors 202, 204, 206, 208 should not be passed (e.g., should be blocked), and blocks those audio sensor(s) 202, 204, 206, 208 accordingly.

In the illustrated example of FIG. 2, the example audio sensor selector 210 adds the audio waveforms received via each of the selected audio sensor(s) 202, 204, 206, 208. However, in some examples, additional processing may be performed such as, for example, applying respective gain(s) to one or more of the selected audio sensor(s) 202, 204, 206, 208. For example, the audio signal received via the first audio sensor 202 may be amplified by a factor of two and may be combined with the audio signal received via the second audio sensor 204 to create a combined audio signal for analysis by the media identifier 230. In examples disclosed herein, the audio waveform(s) received via each of the selected audio sensor(s) 202, 204, 206, 206 are combined in the time domain. However, the audio waveform(s) may be combined in any other fashion. For example, the example audio waveform(s) may be combined in the frequency domain. Moreover, in examples disclosed herein, the example audio waveform(s) are combined prior to digitization. However, in some examples, the example audio waveform(s) may be combined after digitization.

The example configuration memory 220 of the illustrated example of FIG. 2 stores an audio sensor configuration identifying which of the audio sensors 202, 204, 206, 208 should be selected by the audio sensor selector 210 to form the audio signal to be processed by the media identifier 230. However, any other additional configuration and/or operational information may additionally or alternatively be stored. For example, WiFi credentials to be used by the network communicator 260, panelist and/or household identifier(s), etc. may be stored in the configuration memory 220. The example configuration memory 220 may be updated by, for example, the configuration interface 245 and/or the selection tester 240. The example configuration memory 220 of the illustrated example of FIG. 2 may be implemented by any device for storing data such as, for example, flash memory, magnetic media, optical media, etc. Furthermore, the data stored in the example configuration memory 220 may be in any data format such as, for example, binary data, comma delimited data, tab delimited data, structured query language (SQL) structures, etc.

The example media identifier 230 of the illustrated example of FIG. 2 analyzes audio received via one or more of the audio sensor(s) 202, 204, 206, 208 and identifies the media being presented. The example media identifier 230 of the illustrated example outputs an identifier of the media (e.g., media-identifying information) to the audience measurement data controller 250. In the illustrated example of FIG. 2, the example media identifier 230 outputs a quality metric of the media identifier. As used herein, a quality metric is defined to be any value representative of a strength and/or quality of a detected watermark/code. In examples disclosed herein, the quality metric is a signal-to-noise ratio. However, any other quality metric may additionally or alternatively be used such as, for example, a score, a bit error rate (BER), a volume level, etc. Moreover, in some examples, different values representative of the strength and/or quality of the detected watermark/code may be combined to form the quality metric. For example, a signal to noise ratio may be combined with a BER to form the quality metric.

In examples disclosed herein, the media identifier 230 utilizes audio watermarking techniques to identify the media. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or one or more identifier(s) that may be mapped to media identifying information, into an audio and/or video component of the media. In some examples, the audio and/or video component of the media is selected to have a signal characteristic sufficient to hide the watermark. As used herein, the terms "code" and/or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. In some examples, to identify watermarked media, the watermark(s) are extracted and used to access a table of reference watermarks that are mapped to media identifying information.

In some examples, the media identifier 230 may utilize signature-based media identification techniques. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

The example selection tester 240 of the illustrated example of FIG. 2 identifies possible configurations of audio sensor(s) that might be used to receive audio. The example selection tester 240 instructs the example audio sensor selector 210 to iterate through different possible configuration(s) of audio sensor(s), and monitors an output of the media identifier 230 indicating a signal to noise ratio of the detected media-identifying information (e.g., a watermark) for the respective configuration(s). The example selection tester 240 then selects a configuration of audio sensor(s) that has a desired, or best (e.g., greatest) signal to noise ratio, and updates the configuration memory to identify the selected configuration. The selected configuration is then used by the audio sensor selector 210 to select the audio sensors that should have their inputs passed through to the media identifier 230.

In examples disclosed herein, the example selection tester 240 tests signal to noise ratios of the configurations periodically (e.g., every two minutes, every ten minutes, every hour, etc.). Periodic testing reduces a likelihood that media identifying information might be missed as a result of a user changing the configuration of the audio output of the media presentation device 110. For example, the configuration of the audio system might be modified if the user were to change from a broadcast television input (which might use rear-facing speakers) to a Blu-ray disk input (which might use a surround sound system). Moreover, other changes in the environment might cause variations in the media-identification performance of one audio sensor configuration over another such as, for example, a window being opened, a different arrangement of furniture, or any other change(s) in the media presentation environment 102 that might affect the ability of the media identifier 230 to identify media, etc.

In the illustrated example of FIG. 2, the example selection tester 240 performs testing and/or analysis of the signal to noise ratios of the configurations at the meter 114. However, such analysis may additionally or alternatively be performed at any other location such as, for example, the central facility 190, a configuration device communicatively coupled to the meter 114, etc. In some examples, the central facility 190 performs the analysis of audio collected by the various audio sensor configurations of the meter 114 and communicates configuration information to the meter 114. In some examples, the central facility 190 may provide other configuration information and/or operational parameters to the meter 114 such as, for example, an indication of which audio sensor configurations should be omitted from analysis, threshold levels (e.g., a signal to noise threshold described in connection with block 940 of FIG. 9, below), instructions on how often testing and/or analysis is to be performed, etc.

The example configuration interface 245 of the illustrated example of FIG. 2 receives configuration inputs from a user and/or installer of the meter 114. In some examples, the configuration interface 245 enables the user and/or the installer to indicate the audio sensor configuration to be stored in the configuration memory 220 and be used by the audio sensor selector 210. In some examples, the configuration interface 245 enables the user and/or the installer to control other operational parameters of the meter 114 such as, for example, WiFi credentials to be used by the network communicator 260, set a household and/or panelist identifier(s), etc. In the illustrated example of FIG. 2, the configuration interface 245 is implemented by a Bluetooth Low Energy radio. However, the configuration interface 245 may be implemented in any other fashion such as, for example, an infrared input, a universal serial bus (USB) connection, a serial connection, an Ethernet connection, etc. In some examples, the configuration interface 245 enables the meter 114 to be communicatively coupled to a media device such as, for example, the media presentation device 110. Such a communicative coupling enables the configuration interface 245 to, for example, detect an audio configuration of the media presentation device 110 such that the configuration memory 220 may be updated to select the audio sensor(s) 202, 204, 206, 208 corresponding to the selected audio configuration of the media presentation device 110. For example, if the media presentation device were using rear-facing speakers, the audio sensor(s) corresponding to rear-facing microphones may be identified in the configuration memory 220.

The example audience measurement data controller 250 of the illustrated example of FIG. 2 receives media identifying information (e.g., a code, a signature, etc.) from the media identifier 230 and audience identification data from the people identifier 270, and stores the received information in the data store 255. The example audience measurement data controller 250 periodically and/or a-periodically transmits, via the network communicator 260, the audience measurement information stored in the data store 255 to the central facility 190 for aggregation and/or preparation of media monitoring reports.

The example data store 255 of the illustrated example of FIG. 2 may be implemented by any device for storing data such as, for example, flash memory, magnetic media, optical media, etc. Furthermore, the data stored in the example data store 255 may be in any data format such as, for example, binary data, comma delimited data, tab delimited data, structured query language (SQL) structures, etc. In the illustrated example, the example data store 255 stores media identifying information collected by the media identifier 230 and audience identification data collected by the people identifier 270. In some examples, the example data store 255 additionally stores panelist demographic information such that received user identifiers of the audience measurement data can be translated into demographic information prior to transmission to the central facility 190.

The example people identifier 270 of the illustrated example of FIG. 2 determines audience identification data representative of the identities of the audience member(s) (e.g., panelists) present in the media presentation environment 102. In some examples, the people identifier 270 collects audience identification data by periodically or a-periodically prompting audience members in the media presentation environment 102 to identify themselves as present in the audience. Panelists may identify themselves by, for example, pressing a button on a remote, speaking their name, etc. In some examples, the people identifier 270 prompts the audience member(s) to self-identify in response to one or more predetermined events (e.g., when the media presentation device 110 is turned on, a channel is changed, an infrared control signal is detected, etc.). The people identifier 270 provides the audience identification data to the audience measurement data controller such that the audience measurement data can be correlated with the media identification data to facilitate an identification of which media was presented to which audience member.

The example network communicator 260 of the illustrated example of FIG. 2 transmits audience measurement information provided by the audience measurement data controller 250 (e.g., data stored in the data store 255) to the central facility 190 of the audience measurement entity. In the illustrated example, the network communicator 260 is implemented by WiFi antenna that communicates with a WiFi network hosted by the example gateway 140 of FIG. 1. However, in some examples, the network communicator may additionally or alternatively be implemented by an Ethernet port that communicates via an Ethernet network (e.g., a local area network (LAN)). While the example meter 114 communicates data to the central facility 190 via the example gateway 140 in the illustrated example of FIG. 1, data may be transmitted to the central facility 190 in any other fashion. For example, the network communicator 260 may be implemented by a cellular radio, and the example gateway 140 may be a cellular base station. In some examples, the example gateway 140 may be omitted and the example network communicator 260 may transmit data directly to the central facility 190.

The example power receiver 280 of the illustrated example of FIG. 2 is implemented as a universal serial bus (USB) receptacle and enables the meter 114 to be connected to a power source via a cable (e.g., a USB cable). In examples disclosed herein, the media presentation device 110 has a USB port that provides electrical power to, for example, an external device such as the meter 114. In some examples, the media presentation device 110 may provide power to an external device via a different type of port such as, for example, a High Definition Media Interface (HDMI) port, an Ethernet port, etc. The example power receiver 280 may be implemented in any fashion to facilitate receipt of electrical power from the media presentation device 110 or any other power source (e.g., a wall outlet). In some examples, the power receiver 280 may additionally or alternatively facilitate diagnostic communications with the media presentation device 110. For example, the configuration interface 245 may communicate with the media presentation device 110 via the connection provided by the power receiver 280 (e.g., a USB port) to, for example, determine whether the media presentation device 110 is powered on, determine which input is being presented via the media presentation device 110, determine which speakers are being used by the media presentation device 110. In some examples, the connection is an HDMI connection, and the configuration interface 245 communicates with the media presentation device 110 using an HDMI Consumer Electronics Control (CEC) protocol.

The example battery 285 of the illustrated example of FIG. 2 stores power for use by the meter 114. The example battery 285 enables operation of the meter 114 when power is not being supplied to the meter 114 via the power receiver 280. In the illustrated example of FIG. 2, the example battery is implemented using a lithium-ion battery. However, any other type of battery may additionally or alternatively be used. In the illustrated example of FIG. 2, the example battery 285 is rechargeable. As such, the example battery 285 may be recharged while the meter 114 receives power via the power receiver 280 (e.g., while the media presentation device 110 is powered on), to facilitate operation of the meter 114 when the meter 114 is not receiving power via the power receiver 280 (e.g., while the media presentation device 110 is powered off). However, in some examples, the example battery 285 may be non-rechargeable.

Figure 3:
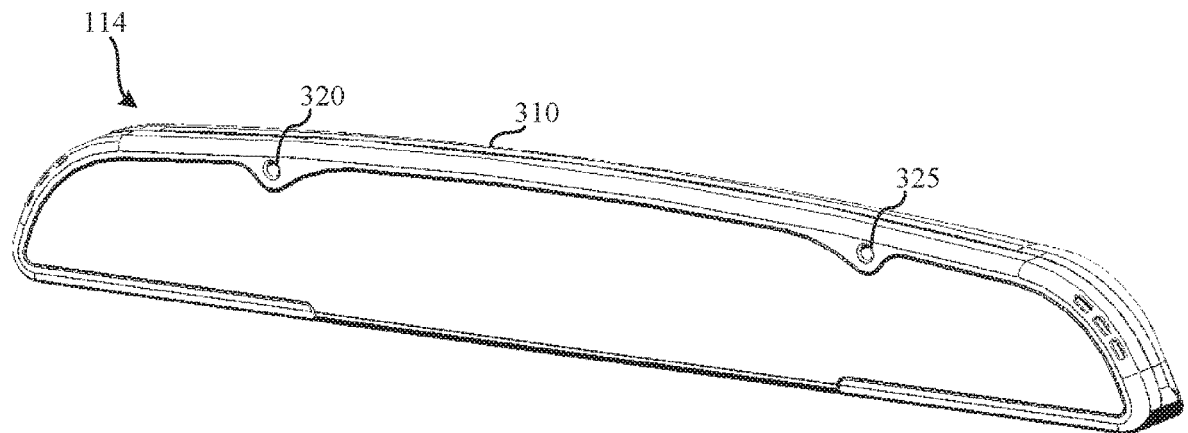
FIG. 3 is an example front view of the example meter of FIGS. 1 and/or 2.

FIG. 3 is an example front view of the example meter 114 of FIGS. 1 and/or 2. In the illustrated example of FIG. 3, the example meter 114 includes a housing 310. In examples disclosed herein, the housing 310 is to be affixed to the media presentation device 110. For example, the housing may be affixed to a top of the media presentation device 110, may be affixed to a bottom of the media presentation device 110, may be affixed to a side of the media presentation device 110, etc. In some examples, the housing 310 of the meter 114 is not affixed to the media presentation device 110. For example, the housing 310 may be placed in any other location within the media presentation environment 102 such that audio may be received by the meter 114.

In the illustrated example of FIG. 3, the example housing 310 includes an example front left opening 320 and an example front right opening 325. The front openings 320, 325 enable free-field audio in front of the housing to be received by the example audio sensors 202, 204, 206, 208, that are positioned towards the front of the meter 114. In the illustrated example of FIG. 3, the front openings 320, 325 are symmetrically aligned on the face of the meter 114. However, the front openings 320, 325 may be arranged in any other fashion. Moreover, while two front openings 320, 325 are shown in the illustrated example of FIG. 3, any other number of openings may additionally or alternatively be used. For example, there may be three openings on the front face of the housing 310, there may be four openings on the front face of the housing 310, etc.

Figure 4:
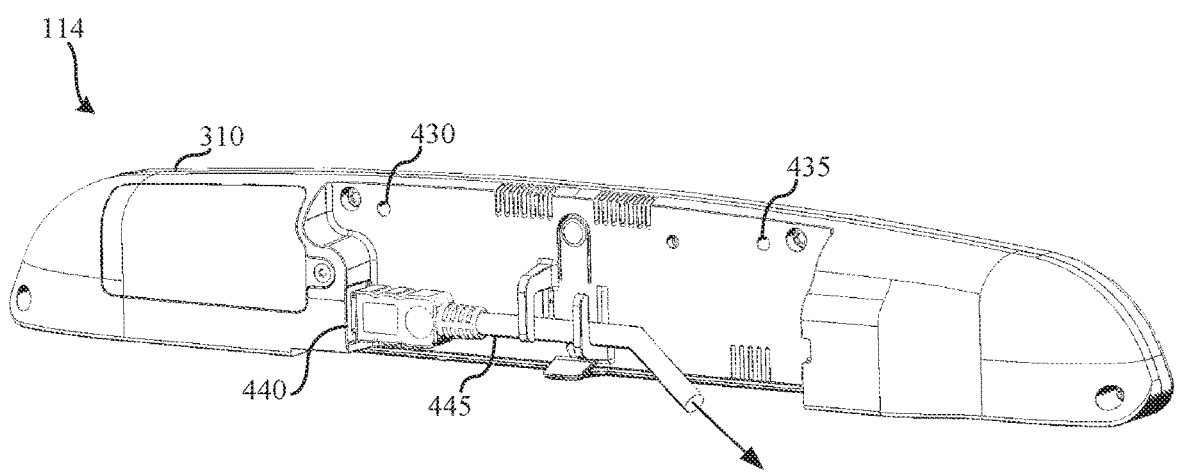
FIG. 4 is an example rear view of the example meter of FIGS. 1 and/or 2.

FIG. 4 is an example rear view of the example meter 114 of FIGS. 1 and/or 2. In the illustrated example of FIG. 4, the example housing 310 includes an example rear left opening 430 and an example rear right opening 435. The rear openings 430, 435 enable free field audio in the rear of the housing 310 to be received by the example audio sensors 202, 204, 206, 208, that are positioned towards the rear of the meter 114. In the illustrated example of FIG. 4, the rear openings 430, 435 are symmetrically aligned on the rear of the meter 114. However, the rear openings 430, 435 may be arranged in any other fashion. Moreover, two rear openings 430, 435 are shown while in the illustrated example of FIG. 4, any other number of openings may additionally or alternatively be used.

In the illustrated example of FIG. 4, the housing 310 includes a USB port 440. In the illustrated example of FIG. 4, the USB port 440 enables a USB cable 445 to connect the power receiver 280 of FIG. 2 to an external power source (e.g., a power source provided by the media presentation device 110). However, any other type(s) and/or number(s) of ports, cables, power source(s), etc. may additionally or alternatively be used.

Figure 5:
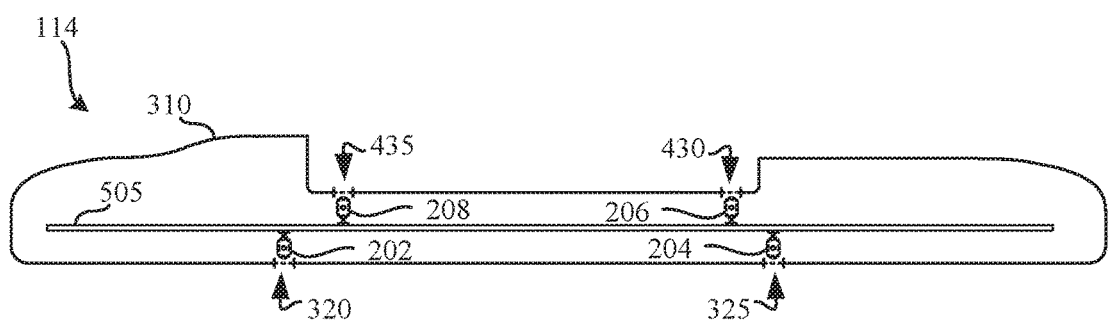
FIG. 5 is an example top view of the example meter of FIGS. 1 and/or 2.

FIG. 5 is an example top view of the example meter 114 of FIGS. 1 and/or 2. In the illustrated example of FIG. 5, the front openings 320, 325 and the rear openings 430, 435 are shown along an outline of the housing 310. Inside the housing 310, an example circuit board 505 (e.g., a circuit board that carries the example components of the example meter 114 of FIG. 2) is shown. In the illustrated example FIG. 5, a single circuit board 505 is shown. However, the example meter 114 may include multiple circuit boards such that components may be positioned to more effectively utilize the space available within the housing 310.

In the illustrated example of FIG. 5, the first audio sensor 202 is connected to the circuit board 505, and is positioned adjacent to the front left opening 320. The second audio sensor 204 is connected to the circuit board 505, and is positioned adjacent to the front right opening 325. The third audio sensor 206 is connected to the circuit board 505, and is positioned adjacent to the rear left opening 430. The fourth audio sensor 208 is connected to the circuit board 505, and is positioned adjacent to the rear right opening 435. As a result, free field audio that is passed through the openings 320, 325, 430, 435 of the housing 310 is picked up by the respective audio sensor 202, 204, 206, 208.

Figure 6:
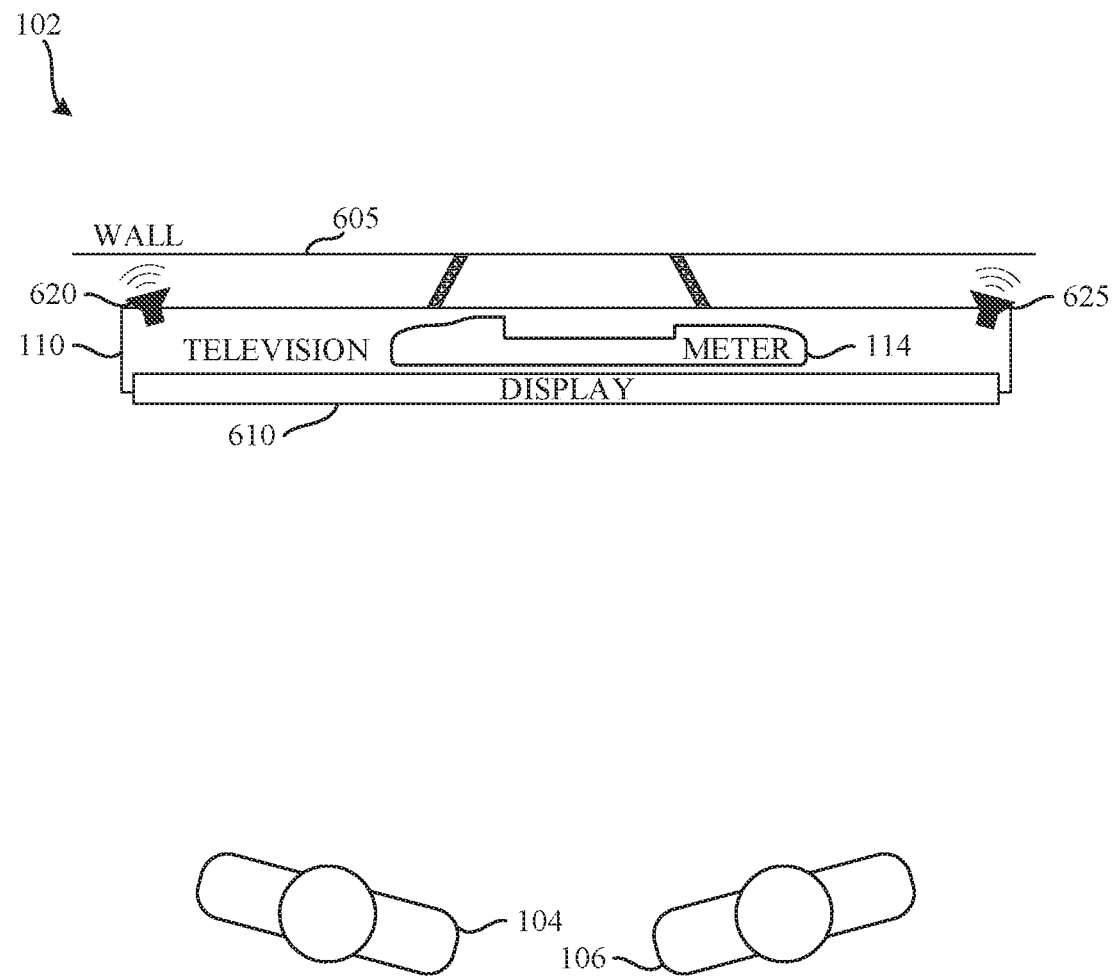
FIG. 6 is a diagram representing an example configuration of the media presentation environment of FIG. 1 where rear-facing speakers are used.

FIG. 6 is a diagram representing an example configuration of the media presentation environment 102 of FIG. 1 where rear-facing speakers are used. In the illustrated example of FIG. 6, the media presentation device 110 is mounted to a wall 605 of the media presentation environment 102. However, in other examples the media presentation device 110 may not be mounted to the wall 605 and may instead, for example, be placed upon furniture within the media presentation environment 102, may be affixed to a ceiling of the media presentation environment 102, etc. In the illustrated example of FIG. 6, the media presentation device 110 is positioned such that a display 610 of the media presentation device 110 is facing into the media presentation environment 102 (e.g., into the room) such that the display 610 is viewable by the panelists 104, 106.

In the illustrated example of FIG. 6, the media presentation device 110 uses rear facing speakers 620, 625. In such an example, front facing audio sensor(s) of the meter 114 might not produce a reliable identification of the media presented by the media presentation device 110. In contrast, rear facing audio sensor(s) of the meter 114 may be more likely to produce a reliable identification of the media presented by the media presentation device. In the illustrated example of FIG. 6, the rear facing speakers 620, 625 are components of the media presentation device 110. However, in some examples the speakers 620, 625 may be components of a separate media device such as, for example, a sound bar, a surround sound system, etc.

Figure 7:
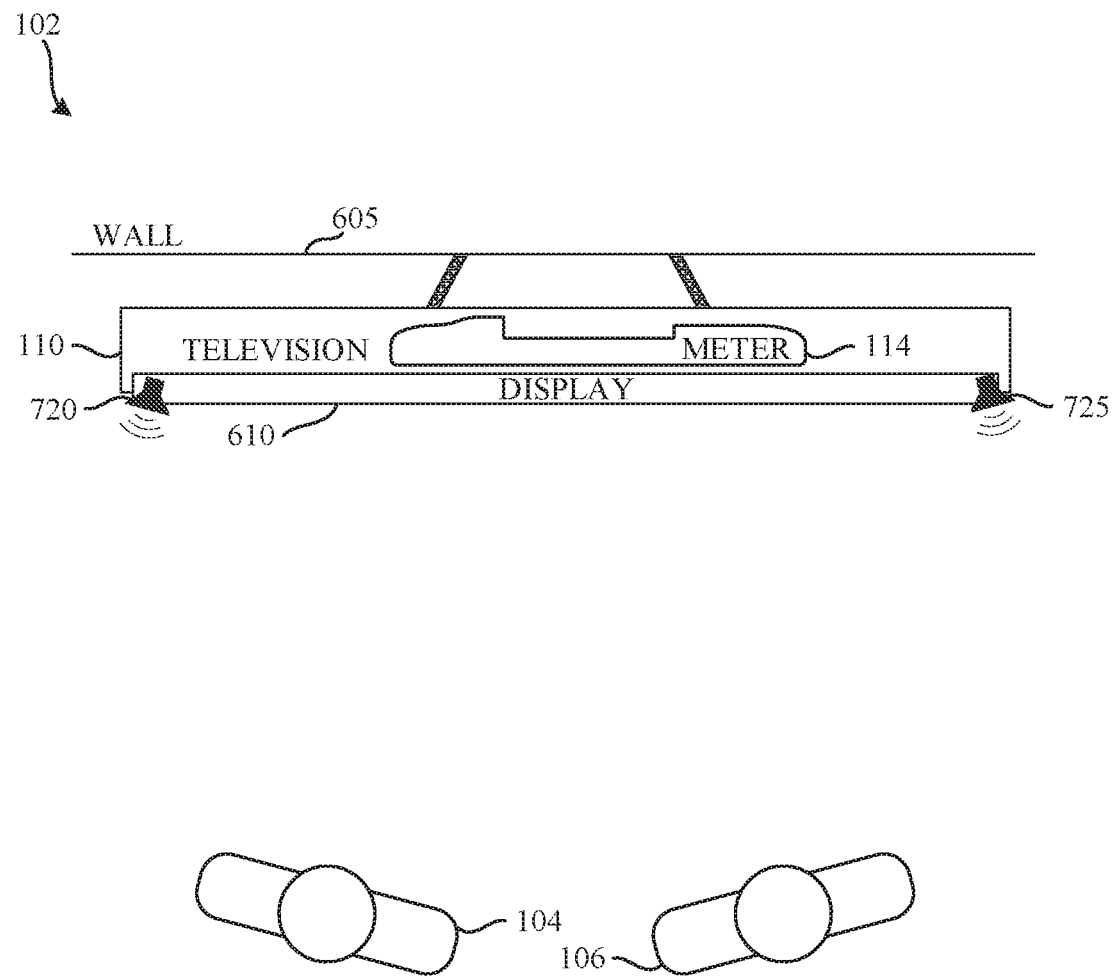
FIG. 7 is a diagram representing an example configuration of the media presentation environment of FIG. 1 where front-facing speakers are used.
Figure 7:
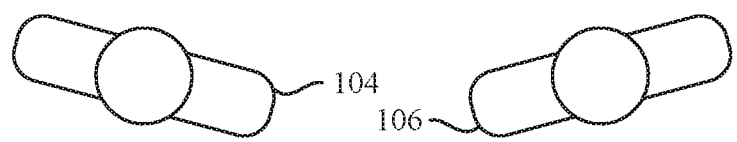

FIG. 7 is a diagram representing an example configuration of the media presentation environment 102 of FIG. 1 where front-facing speakers are used. As described above in connection with the illustrated example of FIG. 6, the media presentation device 110 is mounted to the wall 605. However, in other examples the media presentation device 110 may be positioned in any other location within the example media presentation environment 102. In contrast to the illustrated example of FIG. 6, in the illustrated example of FIG. 7, the media presentation device 110 uses front facing speakers 720, 725. In illustrated example of FIG. 7, rear facing audio sensor(s) of the meter 114 for might not produce reliable identifications of the media presented by the media presentation device 110. Front facing audio sensor(s) of the meter 114, however, are more likely to produce a reliable identification of the media presented by the media presentation device. In the illustrated example of FIG. 7, the front facing speakers 720, 725 are components of the media presentation device 110. However, in some examples the speakers 720, 725 may be components of a separate media device such as, for example, a sound bar, a surround sound system, etc.

Figure 8:
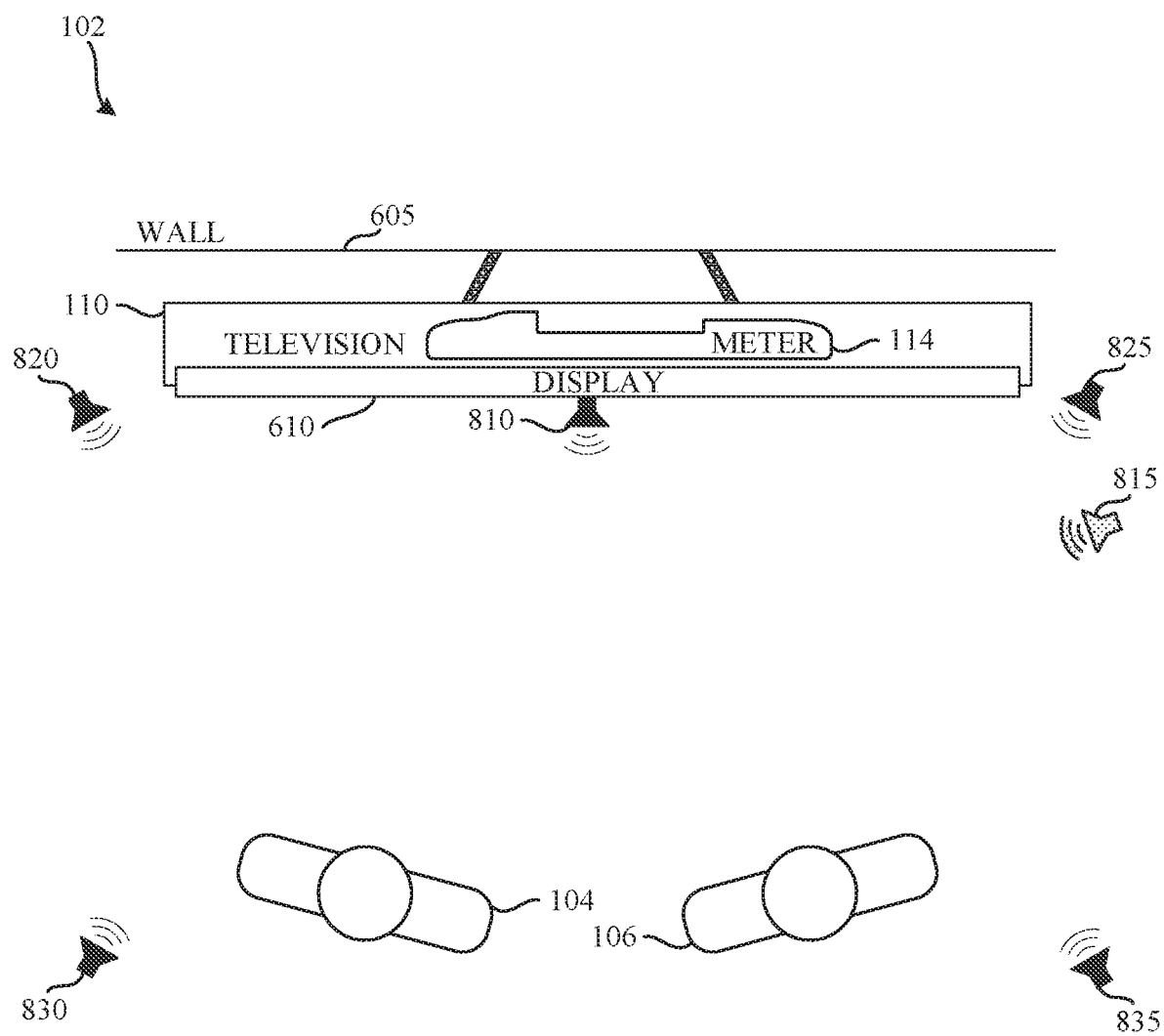
FIG. 8 is a diagram representing an example configuration of the media presentation environment of FIG. 1 where a surround sound speaker system is used.

FIG. 8 is a diagram representing an example configuration of the media presentation environment 102 of FIG. 1, where a surround sound speaker system is used. In the illustrated example of FIG. 8, the media presentation device 110 is mounted to the wall 605. However, in other examples the media presentation device 110 may be positioned in any other location within the example media presentation environment 102. In the illustrated example of FIG. 8, audio is emitted from surround sound speakers. In some examples, the speakers may be communicatively coupled with the media presentation device 110 via for example, an audio/video receiver (e.g., the audio/video receiver 118 of FIG. 1).

In the illustrated example of FIG. 8, the surround sound system includes a center channel speaker 810, a subwoofer 815, a front left channel speaker 820, a front right channel speaker 825, a rear left channel speaker 830, and a rear right channel speaker 835. In illustrated example of FIG. 8, the surround sounds system is arranged in a 5.1 channel configuration. However, any other speaker configuration including any other number(s) of speakers, type(s) of speakers, and/or placements thereof may additionally or alternatively be used. For example, the surround sound speaker system may be arranged in a 7.1 surround-sound configuration. In illustrated example of FIG. 8, variations in the placement of the speakers of the surround sound system may result in different audio environments in which different configurations of the audio sensor(s) of the example meter 114 may result in different levels of recognition of the media presented by the media presentation device 110. For example, rear facing audio sensor(s) might be better suited if the center channel were positioned slightly behind the media presentation device (e.g., towards the wall). Moreover, while in the illustrated example of FIG. 8, surround sound system having a 5.1 channel configuration is used, some media sources right not take advantage of all 5.1 channels. For example, when presenting broadcast television, the surround sound system might only present media in a 2.1 format (e.g., the surround sound system might utilize the front left speaker 820, the front right speaker 825, and subwoofer 815). In such a configuration, the front facing audio sensor(s) of the meter 114 might be more effective at identifying the presented media.

As shown in the illustrated examples of FIGS. 6, 7, and/or 8, different speaker configurations may be used within the media presentation environment 102. In examples disclosed herein, the example meter 114 may be configured based on the speaker configuration of the media presentation environment 102. Moreover, in some examples, the configuration of the speakers may be changed during a media presentation (e.g., as different media sources are selected for presentation by the media presentation device 110). To account for such changes in the acoustic environment, the example meter 114 periodically analyzes different configurations of audio sensors to select an audio sensor configuration that produces the best recognition results.

While an example manner of implementing the example meter 114 of FIG. 1 is illustrated in FIG. 2, one or more of the elements, processes and/or devices illustrated in FIG. 2 may be combined, divided, re-arranged, omitted, eliminated and/or implemented in any other way. Further, the example audio sensor 202, 204, 206, 208, the example audio sensor selector 210, the example configuration memory 220, the example media identifier 230, the example selection tester 240, the example configuration interface 245, the example audience measurement data controller 250, the example data store 255, the example network communicator 260, the example people identifier 270, the example power receiver 280, the example battery 285, and/or, more generally, the example meter 114 of FIGS. 1 and/or 2 may be implemented by hardware, software, firmware and/or any combination of hardware, software and/or firmware. Thus, for example, any of the example audio sensor 202, 204, 206, 208, the example audio sensor selector 210, the example configuration memory 220, the example media identifier 230, the example selection tester 240, the example configuration interface 245, the example audience measurement data controller 250, the example data store 255, the example network communicator 260, the example people identifier 270, the example power receiver 280, the example battery 285, and/or, more generally, the example meter 114 of FIGS. 1 and/or 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio sensor 202, 204, 206, 208, the example audio sensor selector 210, the example configuration memory 220, the example media identifier 230, the example selection tester 240, the example configuration interface 245, the example audience measurement data controller 250, the example data store 255, the example network communicator 260, the example people identifier 270, the example power receiver 280, the example battery 285, and/or, more generally, the example meter 114 of FIGS. 1 and/or 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 114 of FIGS. 1 and/or 2 may include one or more elements, processes and/or devices in addition to, or instead of, those illustrated in FIG. 2, and/or may include more than one of any or all of the illustrated elements, processes and devices.

Figure 9:
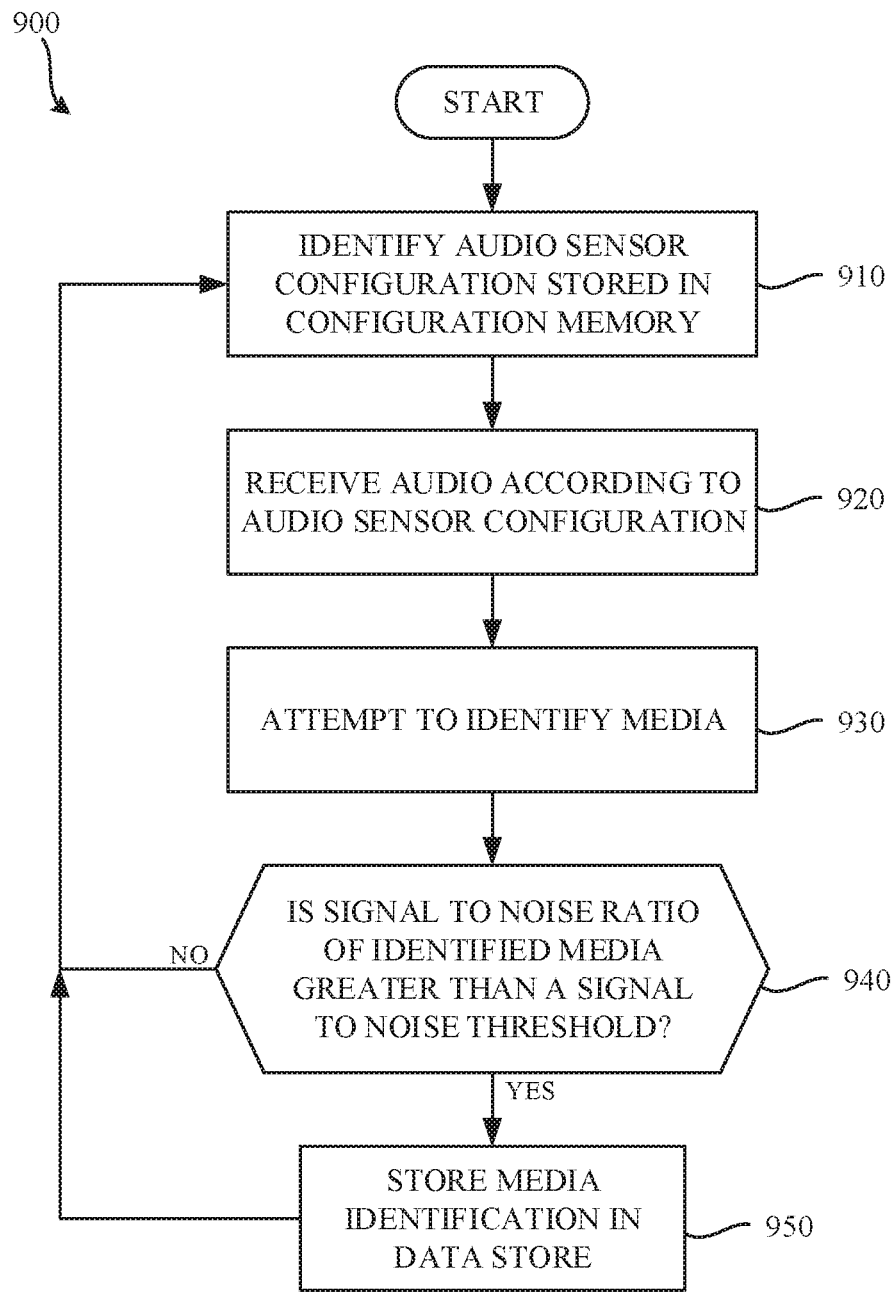
FIG. 9 is a flowchart representative of example machine-readable instructions that may be executed to implement the meter of FIGS. 1 and/or 2 to perform media identification using a selected audio sensor configuration.
Figure 10:
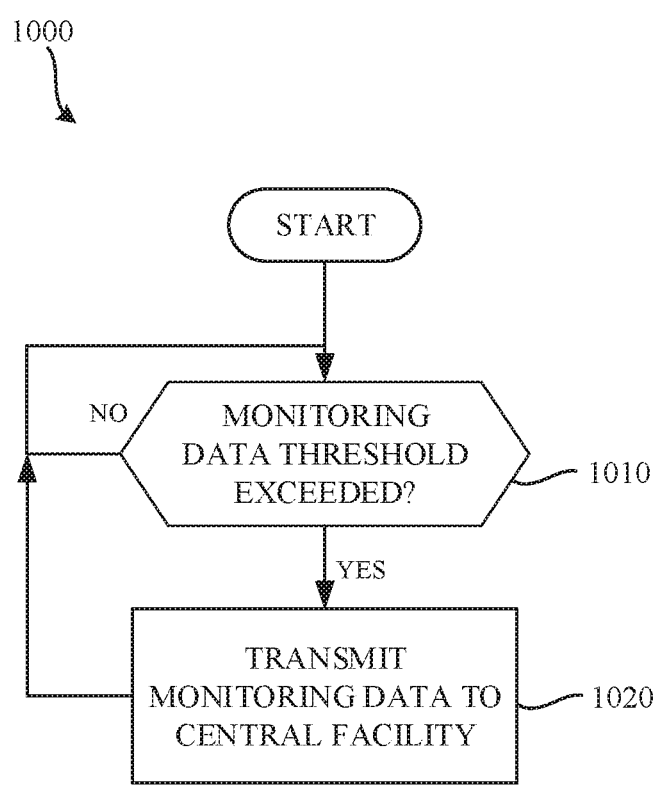
FIG. 10 is a flowchart representative of example machine-readable instructions that may be executed to implement the example meter of FIGS. 1 and/or 2 to transmit media monitoring information to the example central facility of FIG. 1.
Figure 11:
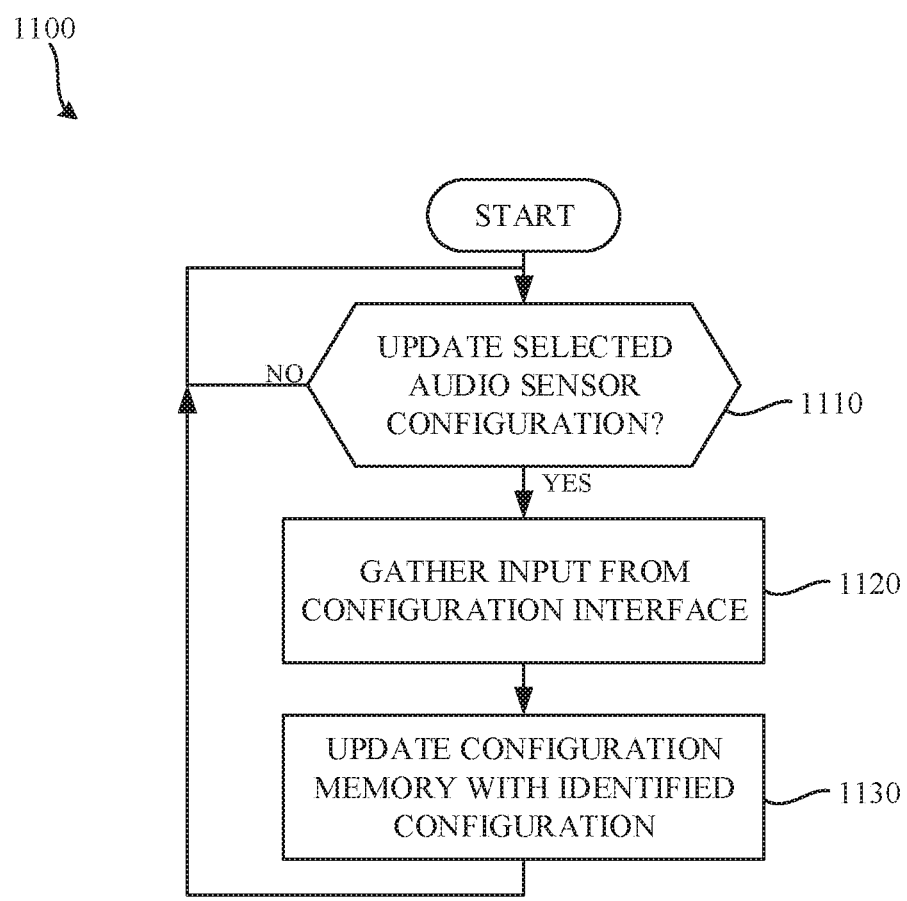
FIG. 11 is a flowchart representative of example machine-readable instructions that may be executed to implement the example meter of FIGS. 1 and/or 2 to update a selected audio sensor configuration using an input from a configuration interface.

Flowcharts representative of example machine readable instructions for implementing the example meter 114 of FIGS. 1 and/or 2 are shown in FIGS. 9, 10, 11, and/or 12. In these examples, the machine readable instructions comprise a program(s) for execution by a processor such as the processor 1412 shown in the example processor platform 1400 discussed below in connection with FIG. 14. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program(s) is/are described with reference to the flowchart(s) illustrated in FIGS. 9, 10, 11, and/or 12, many other methods of implementing the example meter 114 may alternatively be used. For example, the order of execution of the blocks may be changed, and/or some of the blocks described may be changed, eliminated, or combined.

As mentioned above, the example processes of FIGS. 9, 10, 11, and/or 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9, 10, 11, and/or 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 9 is a flowchart representative of example machine-readable instructions 900 that may be executed to implement the meter of FIGS. 1 and/or 2 to perform media identification using a selected audio sensor configuration. The example program 900 the illustrated example of FIG. 9 begins when the example audio sensor selector 210 identifies an audio sensor configuration stored in the configuration memory 220. (Block 910). In the illustrated example of FIG. 9, the audio sensor configuration is stored in the configuration memory 220 by, for example, the configuration interface 245 and/or the example selection tester 240. In examples disclosed herein, the example audio sensor configuration is represented using a binary value corresponding to each of the audio sensors 202, 204, 206, 208. As such, in the illustrated example of FIG. 9, different configurations of the example audio sensors 202, 204, 206, 208, are represented using four bits of memory within the configuration memory 220. However, the example audio sensor configuration may be stored in the example configuration memory in any other fashion. For example, respective gain values corresponding to each of the audio sensors 202, 204, 206, 208 may be stored in the example configuration memory to, for example, enable the audio sensor selector 210 to apply respective gain values (e.g., to increase/amplify an audio signal received via the audio sensor, to reduce an audio signal received via the audio sensor) to the audio signals received via the example audio sensors 202, 204, 206, 208.

The example audio sensor selector 210 receives audio via the audio sensors 202, 204, 206, 208 and combines the received audio. (Block 920). In the illustrated example of FIG. 9, the received audio is mixed according to the audio sensor configuration retrieved from the configuration memory 220 in block 910. The combined audio is passed to the media identifier 230. The example media identifier 230 attempts to identify the media. (Block 930). When attempting to identify the media, the example media identifier 230 determines identifier of the media (e.g., a value of a detected watermark/code), and a signal-to-noise ratio corresponding to the strength of the detected watermark/code. As noted above, while a signal-to-noise ratio is used in examples disclosed herein, any other quality metric may additionally or alternatively be used.

The example audience measurement data controller 250 inspects the signal-to-noise ratio of the identified media to determine whether the signal-to-noise ratio is greater than a signal-to-noise threshold. (Block 940). If, for example, the signal-to-noise ratio of the determined media identifier was low (e.g., there is a low confidence in the determined media identifier), the example audience measurement data controller 250 may discard the determined media identifier. Control then proceeds to block 910 where the example processing of blocks 910 through 940 are repeated. If the example audience measurement data controller 250 determines that the signal-to-noise ratio of the identified media is greater than the signal-to-noise threshold (block 940 returns a result of YES), the example audience measurement data controller 250 stores the determined media identifier in the data store 255. (Block 950). The example process 900 illustrated example of FIG. 9 is then continually repeated to continually attempt to identify media. As disclosed in connection with the illustrated example of FIG. 10, the media identifiers may then be transmitted to the central facility 190 for crediting and/or preparation of a report(s) summarizing media exposure.

FIG. 10 is a flowchart representative of example machine-readable instructions 1000 that may be executed to implement the example meter 114 of FIGS. 1 and/or 2 to transmit media monitoring information to the example central facility 190 of FIG. 1. The example program 1000 of FIG. 10 begins at block 1010 when the audience measurement data controller 250 determines whether a data storage threshold has been exceeded (block 1010). In the illustrated example, the threshold is a time limit specifying that monitoring data is transmitted once every day. Additionally or alternatively, any other periodic and/or aperiodic approach to transmitting monitoring information from the meter 114 may be used. For example, the data threshold might be based on an amount of monitoring information stored in the data store 255.

If the threshold has not been exceeded (block 1010 returns a result of NO) the audience measurement data controller 250 continues to determine whether the monitoring data threshold has been exceeded. When the monitoring data threshold has been exceeded (Block 1010 returns a result of YES), the audience measurement data controller 250 transmits, via the network communicator 260, the stored monitoring information to the central facility 190. In the illustrated example, the network communicator 260 transmits the stored monitoring information via gateway 140 and the network 180. However, in some examples, the network communicator 260 transmits the stored network communications via a local connection such as, for example, a serial connection, a universal serial bus (USB) connection, a Bluetooth connection, etc. When the network communicator 260 transmits via the local connection, the meter 114 may be physically moved to a location of the central facility 190 by, for example, physically mailing the meter 114, etc.

FIG. 11 is a flowchart representative of example machine-readable instructions that may be executed to implement the example meter of FIGS. 1 and/or 2 to update a selected audio sensor configuration using an input from the example configuration interface 245. The example process 1100 the illustrated example of FIG. 11 begins when the example configuration interface 245 determines that the audio sensor configuration stored in the configuration memory 220 is to be updated. (Block 1110). If the audio sensor configuration is not to be updated (e.g., block 1110 returns a result of NO), the example configuration interface 245 continues to monitor for an instruction to update the selected audio sensor configuration. (Block 1110). If the configuration interface 245 determines that the audio sensor configuration 220 is to be updated (block 1110 returns a result of YES), the example configuration interface 245 gathers an input identifying the desired audio sensor configuration. (Block 1120). The example configuration interface 245 then updates the configuration memory 220 with the identified audio sensor configuration. (Block 1130).

In the illustrated example of FIG. 11, the example configuration interface 245 may identify that the audio sensor configuration is to be updated on a periodic basis. For example, the example configuration interface 245 may identify that an input should be read every five minutes. For example, a selector switch and/or a jumper pin on the circuit board 505 of the example meter 114 may be set to select the rear facing audio sensors, may be set to select the front facing audio sensors, and/or may be set to select any other configuration of the audio sensors. In some examples, the input to the configuration interface 245 (e.g., the selector switch, the jumper pin, etc.) maybe set by an installer when configuring the meter in the media presentation environment 102. Additionally or alternatively, the input to the configuration interface 245 may be set at a time of manufacture of the meter 114 such that the meter may be easily installed by a panelist and/or a user of the media presentation device without need for configuration of the meter 114 and/or modification of switches and/or jumper pins.

In some examples, the configuration input received by the configuration interface 245 may be received via, for example, a wireless communication interface (e.g., via a Bluetooth connection to an external configuration device). In such an example, the example configuration interface 245 may determine that the audio sensor configuration is to be updated (block 1110) in response to an instruction received via the wireless communication interface.

In some examples, the configuration input received by the configuration interface may be received directly from the media presentation device 110. For example, the configuration interface 245 may be communicatively coupled to the media presentation device via, for example, the power receiver 280. In such an example, the example configuration interface 245 may take advantage of the connectivity between the meter 114 and the media presentation device 110 via for example, a USB cable, an HDMI cable, etc. In some examples, the configuration interface may interrogate the media presentation device and/or may monitor information received from the media presentation device to identify a speaker configuration of the media presentation device 110. For example, if the configuration interface 245 detects that the media presentation device is using rear facing speakers, the example configuration interface 245 stores a configuration in the configuration memory 220 corresponding to the rear facing audio sensor(s).

Figure 12:
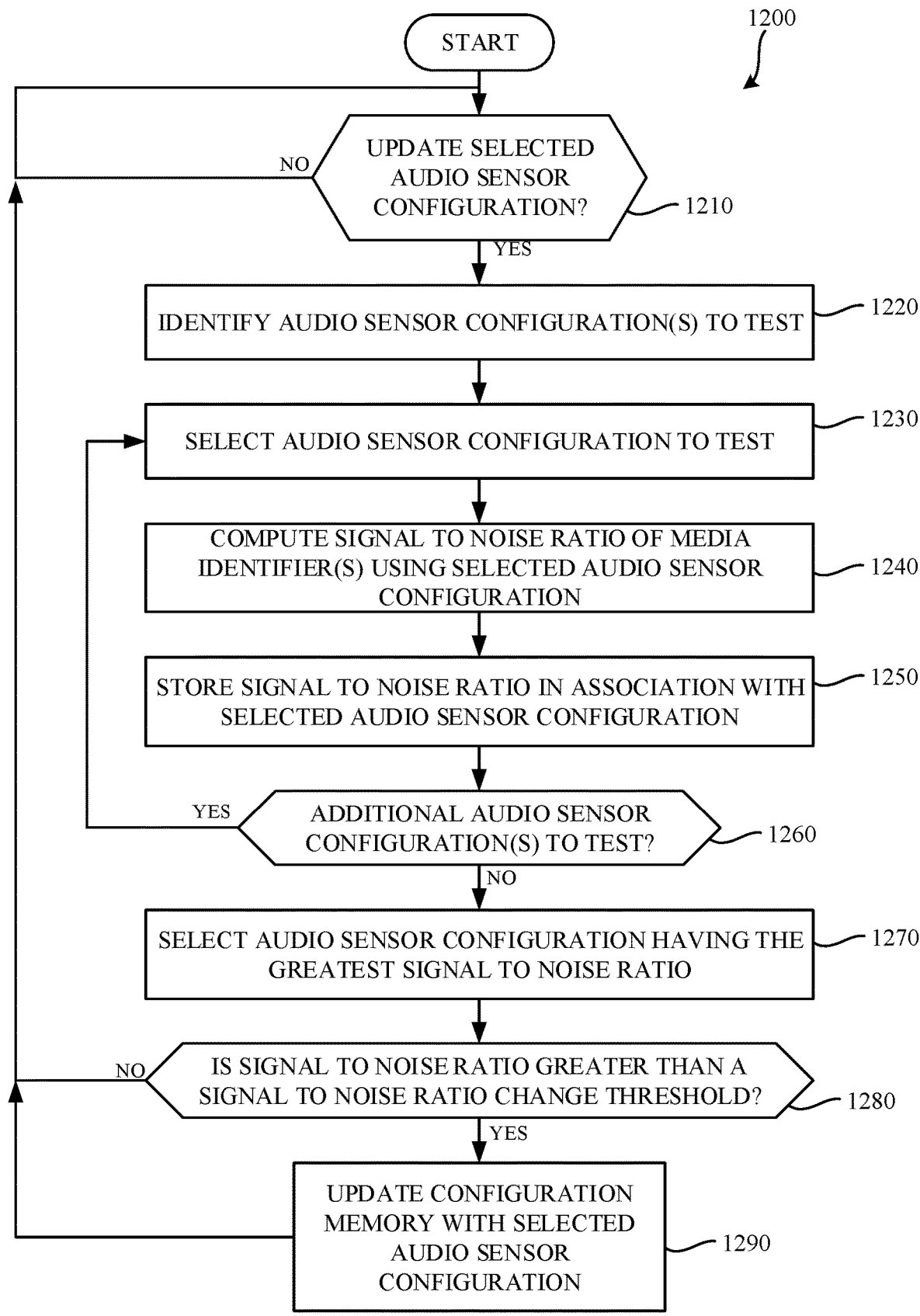
FIG. 12 is a flowchart representative of example machine-readable instructions that may be executed to implement the example meter of FIGS. 1 and/or 2 to update a selected audio sensor configuration based on an automated test of different audio sensor configurations.

FIG. 12 is a flowchart representative of example machine-readable instructions 1200 that may be executed to implement the example meter of FIGS. 1 and/or 2 to update a selected audio sensor configuration based on a test of different audio sensor configurations. The example process 1200 of the illustrated example of FIG. 12 begins when the example selection tester 240 determines whether the selected audio sensor configuration stored in the configuration memory 220 is to be updated. (Block 1210). In the illustrated example of FIG. 12, the example selection tester 240 determines that the audio sensor configuration is to be updated periodically (e.g., every ten minutes, every hour, every day, etc.). However, the example selection tester 240 may determine that the audio sensor configuration stored in the example configuration memory 220 is to be updated on an a-periodic basis such as, for example, in response to an instruction received via the configuration interface 245. If the example selection tester 240 determines that the selected audio sensor configuration stored in the configuration memory 220 is not to be updated (e.g., block 1210 returns a result of NO), the example process of block 1210 of FIG. 12 is repeated until the selection tester 240 determines that the selected audio sensor configurations stored in the example configuration memory 220 is to be updated.

If the example selection tester 240 determines that the audio sensor configuration stored in the configuration memory 220 is to be updated (e.g., block 1210 returns a result of YES), the example selection tester 240 identifies configurations of the example audio sensors 202, 204, 206, 208 to be tested. (Block 1220). In examples disclosed herein, there are four audio sensors 202, 204, 206, 208. As such, there are 15 possible configurations of audio sensors. The example configurations of audio sensors are shown in the example data table 1300 the illustrated example of FIG. 13. For example, the potential configurations may include a single audio sensor, a combination of any two audio sensors, a combination of any three audio sensors, or all four audio sensors. The example data table 1300 the illustrated example of FIG. 13 includes an audio sensor configuration column 1310 and a signal-to-noise ratio column 1315. While a signal to noise ratio column is shown in the illustrated example of FIG. 13, any other quality metric and/or combination of quality metrics may additionally or alternatively be used. The example data table 1300 the illustrated example of FIG. 13 includes rows corresponding to each potential audio sensor configuration.

In the illustrated example of FIG. 13 the audio sensor configuration column 1310 represents the potential audio sensor configurations. In the example audio sensor configuration column 1310 the first audio sensor 202 is identified by the letter A, the second audio sensor 204 is identified by the letter B, the third audio sensor 206 is identified by the letter C, and the fourth audio sensor 208 is identified by the letter D. However, any other nomenclature for naming the potential configurations may additionally or alternatively be used.

In the illustrated example of FIG. 13, a first potential audio sensor configuration 1320 indicates a configuration that includes only the first audio sensor 202 (i.e., the front left microphone). A second potential audio sensor configuration 1322 indicates a configuration that includes only the second audio sensor 204 (i.e., the front right microphone). A third potential audio sensor configuration 1324 indicates a configuration that includes only the third audio sensor 206 (i.e., the rear left microphone). A fourth potential audio sensor configuration 1326 indicates a configuration that includes only the fourth audio sensor 208 (i.e., the rear right microphone).

A fifth potential audio sensor configuration 1328 indicates a configuration that includes a combination of the first audio sensor 202 and the second audio sensor 204 (i.e., the two front microphones). A sixth potential audio sensor configuration 1330 indicates a configuration that includes the first audio sensor 202 and the third audio sensor 206 (i.e., the front left microphone and the rear left microphone). A seventh potential audio sensor configuration 1332 indicates a configuration that includes the first audio sensor 202 and the fourth audio sensor 208 (i.e., the front left microphone in the rear right microphone).

An eighth potential audio sensor configuration 1334 indicates a configuration that includes the first audio sensor 202, the second audio sensor 204, and the third audio sensor 206 (i.e., the two front microphones and the rear left microphone). A ninth potential audio sensor configuration 1336 indicates configuration that includes the first audio sensor 202, the second audio sensor 204, and the fourth audio sensor 208 (i.e., the front two microphones and the rear right microphone). A tenth potential audio sensor configuration 1338 indicates a configuration that includes the first audio sensor 202, the third audio sensor 206, and the fourth audio sensor 208 (i.e., the front left microphone and the two rear microphones).

An eleventh potential audio sensor configuration 1340 indicates a configuration that includes the second audio sensor 204 and the third audio sensor 206 (i.e., the front right microphone and the rear left microphone). A twelfth potential audio sensor configuration 1342 includes second audio sensor 204 and the fourth audio sensor 208 (i.e., the front right microphone in the rear right microphone). A thirteenth potential audio sensor configuration 1344 indicates configuration that includes the second audio sensor 204, the third audio sensor 206, and the fourth audio sensor 208 (i.e., the front right microphone and the two rear microphones).

A fourteenth potential audio sensor configuration 1346 indicates a configuration that includes the third audio sensor 206 and the fourth audio sensor 208 (i.e. the two rear microphones). A fifteenth potential audio sensor configuration 1348 indicates a configuration that includes the first audio sensor 202, the second audio sensor 204, the third audio sensor 206, and the fourth audio sensor 208 (i.e., all four microphones). While, fifteen configurations of four microphones are shown in the illustrated example of FIG. 13, any other configuration(s) may additionally or alternatively be used and/or may be omitted. For example, configurations that solely use audio sensors that are on opposing corners of the meter (e.g., the sixth potential audio sensor configuration 1330, the twelfth potential audio sensor configuration 1340) may be omitted as such configurations may be unlikely to become the selected audio sensor configuration. Omitting such configurations reduces the amount of operations performed when testing the potential audio sensor configurations.

Returning to FIG. 12, the example selection tester 240 selects a possible audio sensor configuration to test. (Block 1230). The example selection tester 240 gathers signal-to-noise ratio information identified by the media identifier 230 while the audio sensor selector 210 is set to the audio sensor configuration to be tested. (Block 1240). The example selection tester 240 stores the signal-to-noise ratio in association with the selected audio sensor configuration. (Block 1250). As noted above, while a signal to noise ratio is used in the illustrated example of FIG. 12, any other quality metric and/or combination of quality metrics may additionally or alternatively be used. As shown in the illustrated example of FIG. 13, each audio sensor configuration (shown in the example audio sensor configuration column 1310) has a corresponding signal-to-noise ratio (shown in the example signal to noise ratio column 1315).

The example selection tester 240 determines whether additional possible audio sensor configurations exist to be tested. (Block 1260). If additional possible audio sensor configurations exist for testing, (block 1260 returns a result of YES), the example selection tester 240 proceeds to test a next selected audio sensor configuration until no audio sensor configurations remain to be tested (block 1260 returns a result of NO). The example selection tester 240 selects the audio sensor configuration that has the greatest signal-to-noise ratio. (Block 1270). As shown in the illustrated example of FIG. 13, the fourteenth example audio sensor configuration 1346 has the greatest signal-to-noise ratio. As a result, in the illustrated example of 13, the fourteenth example audio sensor configuration is selected.

In the illustrated example of FIG. 12, the example selection tester 240 determines whether the signal-to-noise ratio of the selected audio sensor configuration is greater than a signal-to-noise ratio change threshold. (Block 1280). If the signal-to-noise ratio is not greater than the signal-to-noise ratio change threshold, (block 1280 returns a result of NO), the example process of blocks 1210 through 1280 of FIG. 12 is repeated until the selection tester 240 determines that the signal-to-noise ratio of an identified configuration is greater than the signal-to-noise ratio change threshold (block 1280 returns result of YES). In response to determining that the signal-to-noise ratio of the selected audio sensor configuration is greater than the signal-to-noise ratio change threshold (block 1280 returns result YES), the example selection tester 240 updates the configuration memory with the selected audio sensor configuration. (Block 1290.) Using a signal-to-noise ratio change threshold helps ensure that the audio sensor configuration is not inadvertently changed to a configuration that could result in an in-sufficient level of media identification.

The example process of FIG. 12 is then repeated to periodically and/or a periodically update the configuration memory with a selected audio sensor configuration. Periodically updating the configuration memory ensures that, in the event of a change in the audio environment (e.g., a change from the use of rear facing speakers to the use of front facing speakers) the audio sensor configuration is updated to account for the change in the audio environment.

Figure 14:
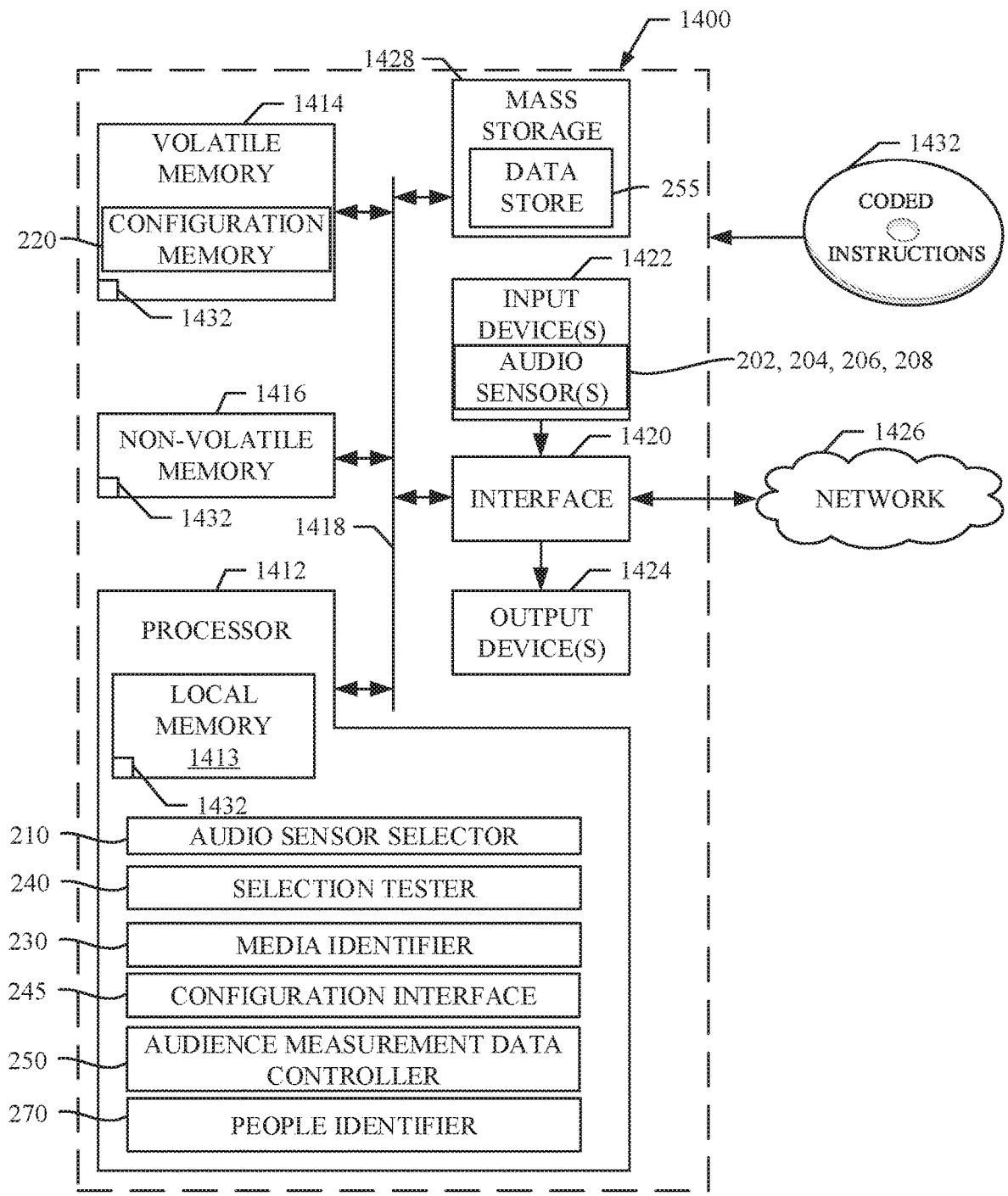
FIG. 14 is a block diagram of an example processor platform capable of executing the machine-readable instructions of FIGS. 9, 10, 11, and/or 12 to perform audio sensor selection in accordance with the teachings of this disclosure.

FIG. 14 is a block diagram of an example processor platform 1400 capable of executing the instructions of FIGS. 9, 10, 11, and/or 12 to implement the meter 114 of FIGS. 1 and/or 2. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). The example processor 1412 executes instructions to implement the example audio sensor selector 210, the example media identifier 230, the example selection tester 240, the example configuration interface 245, the example audience measurement data controller 250, and/or the example people identifier 270. The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. In the illustrated example of FIG. 14, the volatile memory 1414 stores the configuration memory 220. However, any other memory device of the example processor platform 1400 may additionally or alternatively store the example configuration memory 220. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system. In the illustrated example of FIG. 14, the example input device(s) 1422 implement the example audio sensor(s) 202, 204, 206, 208.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIGS. 9, 10, 11, and/or 12 may be stored in the mass storage device 1428, in the volatile memory 1414, in the non-volatile memory 1416, and/or on a removable tangible computer readable storage medium such as a CD or DVD. In the illustrated example of FIG. 14, the example mass storage device 1428 stores the data store 255. However, any other memory device of the example processor platform 1400 may additionally or alternatively store the example data store 255.

From the foregoing, it will be appreciated that the above disclosed methods, apparatus, and articles of manufacture facilitate selection of an audio sensor and/or audio sensor combination in an audience measurement device. In examples disclosed herein, many different audio environments exist and, in some examples, the audio environment in which an audience measurement device (e.g., a meter) is to operate may be modified without notice. In examples disclosed herein, the example audience measurement device accounts for such varying acoustic environments by enabling selection of different audio sensor configurations corresponding to different acoustic environments. Moreover, the example audience measurement device enables testing of various configurations of audio sensor(s) to enable selection of a configuration of one or more audio sensors that results in a reliable media identification. More reliable media identification results in less processor operations used to detect and/or credit media. For example, error-mitigation that would otherwise be performed (e.g., at a central facility of an audience measurement entity) to remove erroneous media identifications might not need to be performed when the media identification is more reliably obtained by the audience measurement device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a first audio sensor to output a first signal;
a second audio sensor to output a second signal;
a selection tester to:
identify a first configuration and a second configuration, the first and second configurations to identify respective gain values to be applied to at least one of the first signal and the second signal;
obtain a first quality metric associated with a first media identification when the gain values of the first configuration are applied;
obtain a second quality metric associated with a second media identification when the gain values of the second configuration are applied; and
select one of the first configuration or the second configuration based on a comparison of the first quality metric and the second quality metric; and
a media identifier to identify media based on the first signal and the second signal with the selected one of the configurations applied.

2. The apparatus of claim 1, further including a configuration memory to store the selected one of the configurations.

3. The apparatus of claim 1, wherein the selection tester is to select the one of the first configuration or the second configuration when at least one of the first quality metric or the second quality metric satisfies a quality metric change threshold.

4. The apparatus of claim 1, further including an audio sensor selector to combine audio based on the selected one of the first configuration or the second configuration to form combined audio, the media identifier to perform the identification based on the combined audio.

5. The apparatus of claim 1, wherein the selection tester is to identify the first configuration and the second configuration periodically.

6. The apparatus of claim 1, wherein the first quality metric and the second quality metric are signal to noise ratios.

7. The apparatus of claim 1, wherein the first quality metric and the second quality metric are a combination of signal to noise ratios and bit error rates.

8. A method, the method comprising:
identifying a first configuration and a second configuration, the first and second configurations to identify respective gain values to be applied to at least one of a first signal output by a first audio sensor of an audience metering device and a second signal output by a second audio sensor of the audience metering device;
obtaining a first quality metric associated with a first media identification when the gain values of the first configuration are applied;
obtaining a second quality metric associated with a second media identification when the gain values of the second configuration are applied;
selecting one of the first configuration or the second configuration based on a comparison of the first quality metric and the second quality metric; and
identifying media based on the first signal and the second signal with the selected one of the configurations applied.

9. The method of claim 8, further including storing the selected one of the configurations in a configuration memory.

10. The method of claim 8, wherein the selecting of the one of the first configuration or the second configuration is performed when at least one of the first quality metric or the second quality metric satisfies a quality metric change threshold.

11. The method of claim 8, wherein the identification of the configurations is performed periodically.

12. The method of claim 8, wherein the first quality metric and the second quality metric are signal to noise ratios.

13. The method of claim 8, wherein the first quality metric and the second quality metric are a combination of signal to noise ratios and bit error rates.

14. A non-transitory readable medium comprising instructions which, when executed, cause an audience metering device to at least:
identify a first configuration and a second configuration, the first and second configurations to identify respective gain values to be applied to at least one of a first signal output by a first audio sensor of the audience metering device and a second signal output by a second audio sensor of the audience metering device;
obtain a first quality metric associated with a first media identification when the gain values of the first configuration are applied;
obtain a second quality metric associated with a second media identification when the gain values of the second audio sensor configuration are applied;
select one of the first configuration or the second configuration based on a comparison of the first quality metric and the second quality metric; and
identify media based on the first signal and the second signal with the selected one of the configurations applied.

15. The non-transitory readable medium of claim 14, wherein the instructions, when executed, further cause the audience metering device to store the selected one of the configurations in a configuration memory.

16. The non-transitory readable medium of claim 14, wherein the selection of the one of the first configuration or the second configuration is performed when at least one of the first quality metric or the second quality metric satisfies a quality metric change threshold.

17. The non-transitory readable medium of claim 14, wherein the identification of the first configuration and second configuration is performed periodically.

18. The non-transitory readable medium of claim 14, wherein the instructions, when executed, further cause the audience metering device to combine audio based on the selected one of the first configuration or the second configuration to form combined audio, the identification of the media based on the combined audio.

19. The non-transitory readable medium of claim 14, wherein the first quality metric and the second quality metric are signal to noise ratios.

20. The non-transitory readable medium of claim 14, wherein the first quality metric and the second quality metric are a combination of signal to noise ratios and bit error rates.

* * * * *

UNITED STATES PATENT AND TRADEMARK OFFICE
CERTIFICATE OF CORRECTION

PATENT NO. : 10,750,354 B2  
APPLICATION NO. : 16/291969  
DATED : August 18, 2020  
INVENTOR(S) : Christen V. Nielsen et al.

Page 1 of 1

It is certified that error appears in the above-identified patent and that said Letters Patent is hereby corrected as shown below:

On the Title Page

Item (72) Inventors should read: Christen V. Nielsen, Palm Harbor, FL (US); James J. Vitt, Palm Harbor, FL (US); Timothy Scott Cooper, Oldsmar, FL (US); Douglas Brent Turnbow, Odessa, FL (US); Kenneth Paul Braman, Port Richey, FL (US)

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*